United States Patent
Bata et al.

(10) Patent No.: US 12,227,318 B1
(45) Date of Patent: Feb. 18, 2025

(54) AERIAL VEHICLES WITH PROXIMITY SENSORS FOR SAFETY

(71) Applicant: Amazon Technologies, Inc., Seattle, WA (US)

(72) Inventors: Assaf Bata, Netanya (IL); Gheorghe Panaghiu, Iasi (RO); Yair E. Gheva, Zichron Yaakov (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/477,141

(22) Filed: Sep. 28, 2023

(51) Int. Cl.
| | |
|---|---|
| *B64U 20/30* | (2023.01) |
| *B64U 20/60* | (2023.01) |
| *B64U 20/83* | (2023.01) |
| *B64U 10/14* | (2023.01) |

(52) U.S. Cl.
CPC ............. *B64U 20/30* (2023.01); *B64U 20/60* (2023.01); *B64U 20/83* (2023.01); *B64U 10/14* (2023.01); *B64U 2201/10* (2023.01)

(58) Field of Classification Search
CPC ........ B64U 20/30; B64U 20/60; B64U 20/83; B64U 10/14; B64U 2201/10
See application file for complete search history.

(56) References Cited

U.S. PATENT DOCUMENTS

| | | |
|---|---|---|
| 3,417,729 A | 12/1968 | Gilday et al. |
| 3,575,527 A | 4/1971 | Sumitani et al. |
| 3,805,723 A | 4/1974 | Bernaerts |
| 4,865,248 A | 9/1989 | Barth |
| 4,954,962 A | 9/1990 | Evans, Jr. et al. |
| 5,040,116 A | 8/1991 | Evans, Jr. et al. |

(Continued)

FOREIGN PATENT DOCUMENTS

| | | | |
|---|---|---|---|
| AU | 2019101130 A4 * | 1/2020 | ............... B64D 1/22 |
| CN | 101385059 A | 3/2009 | |

(Continued)

OTHER PUBLICATIONS

Andrew Amato, "Parrot Announces New Bobop Drone", Dronelife. com, May 12, 2014; http://dronelife.com/2014/05/12/parrot-announces-new-bebop-drone/, accessed Dec. 21, 2016.

(Continued)

*Primary Examiner* — Brian M O'Hara
(74) *Attorney, Agent, or Firm* — Athorus, PLLC

(57) ABSTRACT

An aerial vehicle or another system having moving components may be configured with a capacitive sensing system for detecting body parts of humans or other animals within proximity. The capacitive sensing system includes conductive components provided in association with surfaces of housings within which motors rotate propellers or other objects. The capacitors are coupled to circuits including transistors, resistors, capacitors or other features that are configured to determine levels of capacitance on the conductive components during operations of the aerial vehicle or other system. When a body part approaches a conductive component, and disrupts a level of capacitance on a capacitor coupled to the conductive component, a change in the level of capacitance on the capacitor is detected. Where the change exceeds a predetermined threshold, predetermined actions such as stopping or otherwise altering operations of the motors may be performed.

29 Claims, 16 Drawing Sheets

(56) References Cited

U.S. PATENT DOCUMENTS

| | | |
|---|---|---|
| 5,283,739 A | 2/1994 | Summerville et al. |
| 5,371,581 A | 12/1994 | Wangler et al. |
| 5,386,462 A | 1/1995 | Schlamp |
| 5,452,374 A | 9/1995 | Cullen et al. |
| 5,497,236 A | 3/1996 | Wolff et al. |
| 5,731,884 A | 3/1998 | Inoue |
| 5,847,522 A | 12/1998 | Barba |
| 5,901,253 A | 5/1999 | Tretter |
| 5,995,898 A | 11/1999 | Tuttle |
| 6,031,612 A | 2/2000 | Shirley |
| 6,266,577 B1 | 7/2001 | Popp et al. |
| 6,344,796 B1 | 2/2002 | Ogilvie et al. |
| 6,374,155 B1 | 4/2002 | Wallach et al. |
| 6,426,699 B1 | 7/2002 | Porter |
| 6,507,670 B1 | 1/2003 | Moed |
| 6,543,983 B1 | 4/2003 | Felder et al. |
| 6,636,781 B1 | 10/2003 | Shen et al. |
| 6,676,460 B1 | 1/2004 | Motsenbocker |
| 6,690,997 B2 | 2/2004 | Rivalto |
| 6,694,217 B2 | 2/2004 | Bloom |
| 6,705,523 B1 | 3/2004 | Stamm et al. |
| 6,804,607 B1 | 10/2004 | Wood |
| 6,919,803 B2 | 7/2005 | Breed |
| 6,954,290 B1 | 10/2005 | Braudaway et al. |
| 6,961,711 B1 | 11/2005 | Chee |
| 6,965,440 B1 | 11/2005 | Nakagiri et al. |
| 6,970,838 B1 | 11/2005 | Kamath et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,129,817 B2 | 10/2006 | Yamagishi |
| 7,133,743 B2 | 11/2006 | Tilles et al. |
| 7,145,699 B2 | 12/2006 | Dolan |
| 7,149,611 B2 | 12/2006 | Beck et al. |
| 7,171,879 B2 | 2/2007 | Gass et al. |
| 7,188,513 B2 | 3/2007 | Wilson |
| 7,335,071 B1 | 2/2008 | Motsenbocker |
| 7,337,686 B2 | 3/2008 | Sagi-Dolev |
| 7,337,944 B2 | 3/2008 | Devar |
| 7,339,993 B1 | 3/2008 | Brooks et al. |
| 7,459,880 B1 | 12/2008 | Rosen |
| 7,639,386 B1 | 12/2009 | Siegel et al. |
| 7,668,404 B2 | 2/2010 | Adams et al. |
| 7,673,831 B2 | 3/2010 | Steele et al. |
| 7,685,953 B2 | 3/2010 | Giles |
| 7,693,745 B1 | 4/2010 | Pomerantz et al. |
| 7,894,939 B2 | 2/2011 | Zini et al. |
| 7,925,375 B2 | 4/2011 | Schininger et al. |
| 7,946,526 B2 | 5/2011 | Zimet |
| 7,946,530 B1 | 5/2011 | Talmage, Jr. |
| 7,966,093 B2 | 6/2011 | Zhuk |
| 8,015,023 B1 | 9/2011 | Lee et al. |
| 8,078,317 B2 | 12/2011 | Allinson et al. |
| 8,126,642 B2 | 2/2012 | Trepagnier et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,286,236 B2 | 10/2012 | Jung et al. |
| 8,412,588 B1 | 4/2013 | Bodell et al. |
| 8,418,959 B2 | 4/2013 | Kang et al. |
| 8,429,754 B2 | 4/2013 | Jung et al. |
| 8,473,189 B2 | 6/2013 | Christoph |
| 8,511,606 B1 | 8/2013 | Lutke et al. |
| 8,577,538 B2 | 11/2013 | Lenser et al. |
| 8,599,027 B2 | 12/2013 | Sanchez |
| 8,602,349 B2 | 12/2013 | Petrov |
| 8,639,400 B1 | 1/2014 | Wong |
| 8,736,820 B2 | 5/2014 | Choe et al. |
| 8,752,166 B2 | 6/2014 | Jung et al. |
| 8,791,790 B2 | 7/2014 | Robertson et al. |
| 8,874,301 B1 | 10/2014 | Rao et al. |
| 8,899,903 B1 | 12/2014 | Saad et al. |
| 8,948,914 B2 | 2/2015 | Zini et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,051,043 B1 | 6/2015 | Peeters et al. |
| 9,079,587 B1 | 7/2015 | Rupp et al. |
| 9,139,310 B1 | 9/2015 | Wang |
| 9,163,909 B2 | 10/2015 | Chengalva |
| 9,193,452 B2 | 11/2015 | Carreker |
| 9,195,959 B1 | 11/2015 | Lopez et al. |
| 9,216,587 B2 | 12/2015 | Ando et al. |
| 9,216,857 B1 | 12/2015 | Kalyan et al. |
| 9,230,236 B2 | 1/2016 | Villamar |
| 9,235,213 B2 | 1/2016 | Villamar |
| 9,244,147 B1 | 1/2016 | Soundararajan et al. |
| 9,256,852 B1 | 2/2016 | Myllymaki |
| 9,261,578 B2 | 2/2016 | Im et al. |
| 9,321,531 B1 | 4/2016 | Takayama et al. |
| 9,336,506 B2 | 5/2016 | Shucker et al. |
| 9,336,635 B2 | 5/2016 | Robertson et al. |
| 9,358,975 B1 | 6/2016 | Watts |
| 9,373,149 B2 | 6/2016 | Abhyanker |
| 9,381,916 B1 | 7/2016 | Zhu et al. |
| 9,397,518 B1 | 7/2016 | Theobald |
| 9,404,761 B2 | 8/2016 | Meuleau |
| 9,409,644 B2 | 8/2016 | Stanek et al. |
| 9,411,337 B1 | 8/2016 | Theobald et al. |
| 9,412,280 B1 | 8/2016 | Zwillinger et al. |
| 9,436,183 B2 | 9/2016 | Thakur et al. |
| 9,436,926 B2 | 9/2016 | Cousins et al. |
| 9,448,559 B2 | 9/2016 | Kojo et al. |
| 9,489,490 B1 | 11/2016 | Theobald |
| 9,510,316 B2 | 11/2016 | Skaaksrud |
| 9,535,421 B1 | 1/2017 | Canoso et al. |
| 9,545,852 B2 | 1/2017 | Streett |
| 9,561,941 B1 | 2/2017 | Watts |
| 9,568,335 B2 | 2/2017 | Thakur et al. |
| 9,582,950 B2 | 2/2017 | Shimizu et al. |
| 9,600,645 B2 | 3/2017 | Fadell et al. |
| 9,619,776 B1 | 4/2017 | Ford et al. |
| 9,623,553 B1 | 4/2017 | Theobald et al. |
| 9,623,562 B1 | 4/2017 | Watts |
| 9,650,136 B1 | 5/2017 | Haskin et al. |
| 9,652,912 B2 | 5/2017 | Fadell et al. |
| 9,656,805 B1 | 5/2017 | Evans et al. |
| 9,671,791 B1 | 6/2017 | Paczan |
| 9,677,564 B1 | 6/2017 | Woodworth et al. |
| 9,682,481 B2 | 6/2017 | Lutz et al. |
| 9,697,730 B2 | 7/2017 | Thakur et al. |
| 9,718,564 B1 | 8/2017 | Beckman et al. |
| 9,720,414 B1 | 8/2017 | Theobald |
| 9,731,821 B2 | 8/2017 | Hoareau et al. |
| 9,733,646 B1 | 8/2017 | Nusser et al. |
| 9,746,852 B1 | 8/2017 | Watts et al. |
| 9,746,853 B2 | 8/2017 | Scheepjens et al. |
| 9,778,653 B1 | 10/2017 | McClintock et al. |
| 9,786,187 B1 | 10/2017 | Bar-Zeev et al. |
| 9,796,529 B1 | 10/2017 | Hoareau et al. |
| 9,828,092 B1 | 11/2017 | Navot et al. |
| 9,858,604 B2 | 1/2018 | Apsley et al. |
| 9,886,035 B1 | 2/2018 | Watts et al. |
| 9,896,204 B1 | 2/2018 | Willison |
| 9,959,771 B1 | 5/2018 | Carlson |
| 9,959,773 B2 | 5/2018 | Raptopoulos et al. |
| 9,974,612 B2 | 5/2018 | Pinter et al. |
| 10,022,753 B2 | 7/2018 | Chelian et al. |
| 10,022,867 B2 | 7/2018 | Saboo et al. |
| 10,048,697 B1 | 8/2018 | Theobald |
| 10,108,185 B1 | 10/2018 | Theobald |
| 10,137,984 B1 | 11/2018 | Flick |
| 10,558,226 B1 | 2/2020 | Bigdeli |
| 10,780,988 B2 | 9/2020 | Buchmueller et al. |
| 11,161,608 B2 * | 11/2021 | Namgoong .......... G08G 5/0013 |
| 11,851,162 B1 * | 12/2023 | Daube .................... B64U 20/70 |
| 12,089,385 B2 * | 9/2024 | Zaghloul ................ B64U 20/60 |
| 2001/0045449 A1 | 11/2001 | Shannon |
| 2002/0016726 A1 | 2/2002 | Ross |
| 2002/0035450 A1 | 3/2002 | Thackston |
| 2002/0072979 A1 | 6/2002 | Sinha et al. |
| 2002/0087375 A1 | 7/2002 | Griffin et al. |
| 2002/0107751 A1 | 8/2002 | Rajagopalan et al. |
| 2002/0111914 A1 | 8/2002 | Terada et al. |

(56) References Cited

U.S. PATENT DOCUMENTS

| | | |
|---|---|---|
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0072031 A1 | 4/2003 | Kuwata et al. |
| 2003/0121968 A1 | 7/2003 | Miller et al. |
| 2003/0141411 A1 | 7/2003 | Pandya et al. |
| 2004/0002898 A1 | 1/2004 | Kuhlmann et al. |
| 2004/0068416 A1 | 4/2004 | Solomon |
| 2004/0112660 A1 | 6/2004 | Johansson et al. |
| 2004/0160335 A1 | 8/2004 | Reitmeier et al. |
| 2004/0162638 A1 | 8/2004 | Solomon |
| 2004/0257199 A1 | 12/2004 | Fitzgibbon et al. |
| 2005/0068178 A1 | 3/2005 | Lee et al. |
| 2005/0093865 A1 | 5/2005 | Jia |
| 2005/0102240 A1 | 5/2005 | Misra et al. |
| 2005/0244060 A1 | 11/2005 | Nagarajan et al. |
| 2005/0285934 A1 | 12/2005 | Carter |
| 2006/0053534 A1 | 3/2006 | Mullen |
| 2006/0118162 A1 | 6/2006 | Saelzer et al. |
| 2006/0136237 A1 | 6/2006 | Spiegel et al. |
| 2006/0287829 A1 | 12/2006 | Pashko-Paschenko |
| 2007/0016496 A1 | 1/2007 | Bar et al. |
| 2007/0073552 A1 | 3/2007 | Hileman |
| 2007/0102565 A1 | 5/2007 | Speer et al. |
| 2007/0150375 A1 | 6/2007 | Yang |
| 2007/0170237 A1 | 7/2007 | Neff |
| 2007/0210953 A1 | 9/2007 | Abraham et al. |
| 2007/0233337 A1 | 10/2007 | Plishner |
| 2007/0244763 A1 | 10/2007 | Williams et al. |
| 2007/0246601 A1 | 10/2007 | Layton |
| 2007/0262195 A1 | 11/2007 | Bulaga et al. |
| 2007/0293978 A1 | 12/2007 | Wurman et al. |
| 2008/0012697 A1 | 1/2008 | Smith et al. |
| 2008/0027591 A1 | 1/2008 | Lenser et al. |
| 2008/0100258 A1 | 5/2008 | Ward |
| 2008/0109246 A1 | 5/2008 | Russell |
| 2008/0111816 A1 | 5/2008 | Abraham et al. |
| 2008/0141921 A1 | 6/2008 | Hinderks |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0184906 A1 | 8/2008 | Kejha |
| 2008/0189012 A1 | 8/2008 | Kaufmann |
| 2008/0301009 A1 | 12/2008 | Plaster et al. |
| 2009/0027253 A1 | 1/2009 | Tooren et al. |
| 2009/0062974 A1 | 3/2009 | Tamamoto et al. |
| 2009/0063166 A1 | 3/2009 | Palmer |
| 2009/0079388 A1 | 3/2009 | Reddy |
| 2009/0086275 A1 | 4/2009 | Liang et al. |
| 2009/0091435 A1 | 4/2009 | Bolourchi |
| 2009/0106124 A1 | 4/2009 | Yang |
| 2009/0149985 A1 | 6/2009 | Chirnomas |
| 2009/0164379 A1 | 6/2009 | Jung et al. |
| 2009/0165127 A1 | 6/2009 | Jung et al. |
| 2009/0236470 A1 | 9/2009 | Goossen et al. |
| 2009/0254457 A1 | 10/2009 | Folsom |
| 2009/0254482 A1 | 10/2009 | Vadlamani et al. |
| 2009/0299903 A1 | 12/2009 | Hung et al. |
| 2009/0303507 A1 | 12/2009 | Abeloe |
| 2009/0314883 A1 | 12/2009 | Arlton et al. |
| 2010/0007479 A1 | 1/2010 | Smith |
| 2010/0030608 A1 | 2/2010 | Kaminsky et al. |
| 2010/0031351 A1 | 2/2010 | Jung et al. |
| 2010/0088163 A1 | 4/2010 | Davidson et al. |
| 2010/0088175 A1 | 4/2010 | Lundquist |
| 2010/0100269 A1 | 4/2010 | Ekhaguere et al. |
| 2010/0169185 A1 | 7/2010 | Cottingham |
| 2010/0206145 A1 | 8/2010 | Tetelbaum et al. |
| 2010/0287065 A1 | 11/2010 | Alivandi |
| 2010/0299067 A1 | 11/2010 | McCollough et al. |
| 2010/0299222 A1 | 11/2010 | Hamilton et al. |
| 2011/0035149 A1 | 2/2011 | McAndrew et al. |
| 2011/0074570 A1 | 3/2011 | Feldstein et al. |
| 2011/0087350 A1 | 4/2011 | Fogel et al. |
| 2011/0112761 A1 | 5/2011 | Hurley et al. |
| 2011/0153052 A1 | 6/2011 | Pettibone et al. |
| 2011/0166707 A1 | 7/2011 | Romanov et al. |
| 2011/0178711 A1 | 7/2011 | Christoph |
| 2011/0210866 A1 | 9/2011 | David et al. |
| 2011/0227435 A1 | 9/2011 | Maeda |
| 2011/0246331 A1 | 10/2011 | Luther et al. |
| 2011/0253831 A1 | 10/2011 | Cheng |
| 2011/0264311 A1 | 10/2011 | Lee et al. |
| 2011/0282476 A1 | 11/2011 | Hegemier et al. |
| 2011/0301787 A1 | 12/2011 | Chaperon et al. |
| 2011/0313878 A1 | 12/2011 | Norman |
| 2012/0039694 A1 | 2/2012 | Suzanne |
| 2012/0078592 A1 | 3/2012 | Sims |
| 2012/0091260 A1 | 4/2012 | Callou |
| 2012/0109419 A1 | 5/2012 | Mercado |
| 2012/0219397 A1 | 8/2012 | Baker |
| 2012/0221438 A1 | 8/2012 | Cook et al. |
| 2012/0227389 A1 | 9/2012 | Hinderks |
| 2012/0229325 A1 | 9/2012 | Dutruc |
| 2012/0234969 A1 | 9/2012 | Savoye et al. |
| 2012/0235606 A1 | 9/2012 | Takeuchi |
| 2012/0323365 A1 | 12/2012 | Taylor et al. |
| 2013/0006739 A1 | 1/2013 | Horvitz et al. |
| 2013/0073477 A1 | 3/2013 | Grinberg |
| 2013/0081245 A1 | 4/2013 | Vavrina et al. |
| 2013/0093582 A1 | 4/2013 | Walsh et al. |
| 2013/0126611 A1 | 5/2013 | Kangas et al. |
| 2013/0148123 A1 | 6/2013 | Hayashi |
| 2013/0206915 A1 | 8/2013 | Desaulniers |
| 2013/0218446 A1 | 8/2013 | Bradley et al. |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0320133 A1 | 12/2013 | Ratti et al. |
| 2013/0324164 A1 | 12/2013 | Vulcano |
| 2013/0332062 A1 | 12/2013 | Kreitmair-Steck et al. |
| 2014/0010656 A1 | 1/2014 | Nies |
| 2014/0022055 A1 | 1/2014 | Levien et al. |
| 2014/0025230 A1 | 1/2014 | Levien et al. |
| 2014/0030444 A1 | 1/2014 | Swaminathan et al. |
| 2014/0031964 A1 | 1/2014 | Sidhu et al. |
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Isbjornssund et al. |
| 2014/0081445 A1 | 3/2014 | Villamar |
| 2014/0089073 A1 | 3/2014 | Jacobs et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0156053 A1 | 6/2014 | Mahdavi et al. |
| 2014/0180914 A1 | 6/2014 | Abhyanker |
| 2014/0200697 A1 | 7/2014 | Cheng |
| 2014/0214684 A1 | 7/2014 | Pell |
| 2014/0244433 A1 | 8/2014 | Cruz |
| 2014/0254896 A1 | 9/2014 | Zhou et al. |
| 2014/0271200 A1 | 9/2014 | Sutton et al. |
| 2014/0283104 A1 | 9/2014 | Nilsson |
| 2014/0309813 A1 | 10/2014 | Ricci |
| 2014/0325218 A1 | 10/2014 | Shimizu et al. |
| 2014/0330456 A1 | 11/2014 | Morales et al. |
| 2015/0006005 A1 | 1/2015 | Yu et al. |
| 2015/0066178 A1 | 3/2015 | Stava |
| 2015/0069968 A1 | 3/2015 | Pounds |
| 2015/0098819 A1 | 4/2015 | Tourin et al. |
| 2015/0102154 A1 | 4/2015 | Duncan et al. |
| 2015/0112837 A1 | 4/2015 | O'Dea |
| 2015/0112885 A1 | 4/2015 | Fadell et al. |
| 2015/0120094 A1 | 4/2015 | Kimchi et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0154545 A1 | 6/2015 | Skaaksrud et al. |

(56) References Cited

U.S. PATENT DOCUMENTS

| | | |
|---|---|---|
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0191255 A1 | 7/2015 | Zolich et al. |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0253777 A1 | 9/2015 | Binney et al. |
| 2015/0254611 A1 | 9/2015 | Perez |
| 2015/0259078 A1 | 9/2015 | Filipovic et al. |
| 2015/0286216 A1 | 10/2015 | Miwa |
| 2015/0314881 A1 | 11/2015 | Tsaliah et al. |
| 2015/0317597 A1 | 11/2015 | Shucker et al. |
| 2015/0332206 A1 | 11/2015 | Trew et al. |
| 2015/0367850 A1 | 12/2015 | Clarke et al. |
| 2015/0370251 A1 | 12/2015 | Siegel et al. |
| 2016/0001877 A1 | 1/2016 | Paulos |
| 2016/0009413 A1 | 1/2016 | Lee et al. |
| 2016/0019495 A1 | 1/2016 | Kolchin |
| 2016/0033966 A1 | 2/2016 | Farris et al. |
| 2016/0058181 A1 | 3/2016 | Han et al. |
| 2016/0068267 A1 | 3/2016 | Liu et al. |
| 2016/0085238 A1 | 3/2016 | Hayes |
| 2016/0104099 A1 | 4/2016 | Villamar |
| 2016/0104113 A1 | 4/2016 | Gorlin |
| 2016/0107750 A1 | 4/2016 | Yates |
| 2016/0114488 A1 | 4/2016 | Medina et al. |
| 2016/0117931 A1 | 4/2016 | Chan et al. |
| 2016/0125746 A1 | 5/2016 | Kunzi et al. |
| 2016/0129592 A1 | 5/2016 | Saboo et al. |
| 2016/0130015 A1 | 5/2016 | Caubel et al. |
| 2016/0132059 A1 | 5/2016 | Mason et al. |
| 2016/0144734 A1 | 5/2016 | Wang et al. |
| 2016/0144982 A1 | 5/2016 | Sugumaran |
| 2016/0180618 A1 | 6/2016 | Ho et al. |
| 2016/0196755 A1 | 7/2016 | Navot et al. |
| 2016/0196756 A1 | 7/2016 | Prakash et al. |
| 2016/0200438 A1 | 7/2016 | Bokeno et al. |
| 2016/0207627 A1 | 7/2016 | Hoareau et al. |
| 2016/0214717 A1 | 7/2016 | Silva |
| 2016/0214728 A1 | 7/2016 | Rossi et al. |
| 2016/0235236 A1 | 8/2016 | Byers et al. |
| 2016/0236778 A1 | 8/2016 | Takayama et al. |
| 2016/0239789 A1 | 8/2016 | Hanks |
| 2016/0239803 A1 | 8/2016 | Borley et al. |
| 2016/0257401 A1 | 9/2016 | Buchmueller et al. |
| 2016/0258775 A1 | 9/2016 | Santilli et al. |
| 2016/0266578 A1 | 9/2016 | Douglas et al. |
| 2016/0282126 A1 | 9/2016 | Watts et al. |
| 2016/0299233 A1 | 10/2016 | Levien et al. |
| 2016/0321503 A1 | 11/2016 | Zhou |
| 2016/0334229 A1 | 11/2016 | Ross et al. |
| 2016/0340021 A1 | 11/2016 | Zhang et al. |
| 2016/0364660 A1 | 12/2016 | Brown |
| 2016/0364679 A1 | 12/2016 | Cao |
| 2016/0364823 A1 | 12/2016 | Cao |
| 2016/0364989 A1 | 12/2016 | Speasl et al. |
| 2017/0011333 A1 | 1/2017 | Greiner et al. |
| 2017/0011340 A1 | 1/2017 | Gabbai |
| 2017/0032315 A1 | 2/2017 | Gupta et al. |
| 2017/0087999 A1 | 3/2017 | Miller et al. |
| 2017/0096222 A1 | 4/2017 | Spinelli et al. |
| 2017/0098378 A1 | 4/2017 | Soundararajan et al. |
| 2017/0100837 A1 | 4/2017 | Zevenbergen et al. |
| 2017/0101017 A1 | 4/2017 | Streett |
| 2017/0113352 A1 | 4/2017 | Lutz et al. |
| 2017/0147975 A1 | 5/2017 | Natarajan et al. |
| 2017/0154347 A1 | 6/2017 | Bateman |
| 2017/0164319 A1 | 6/2017 | Skaaksrud et al. |
| 2017/0167881 A1 | 6/2017 | Rander et al. |
| 2017/0193442 A1 | 7/2017 | Ekkel et al. |
| 2017/0199522 A1 | 7/2017 | Li et al. |
| 2017/0255896 A1 | 9/2017 | Dyke |
| 2017/0286905 A1 | 10/2017 | Richardson et al. |
| 2017/0300855 A1 | 10/2017 | Lund et al. |
| 2017/0305526 A1 | 10/2017 | Thomassey |
| 2017/0308098 A1 | 10/2017 | Yu et al. |
| 2017/0316379 A1 | 11/2017 | Lepek et al. |
| 2017/0330145 A1 | 11/2017 | Studnicka et al. |
| 2017/0345245 A1 | 11/2017 | Torresani et al. |
| 2017/0372256 A1 | 12/2017 | Kantor et al. |
| 2018/0024554 A1 | 1/2018 | Brady et al. |
| 2018/0088586 A1 | 3/2018 | Hance et al. |
| 2018/0127211 A1 | 5/2018 | Jarvis et al. |
| 2018/0137454 A1 | 5/2018 | Kulkarni et al. |
| 2018/0203464 A1 | 7/2018 | Yu et al. |
| 2019/0135403 A1 | 5/2019 | Perry et al. |

FOREIGN PATENT DOCUMENTS

| | | |
|---|---|---|
| CN | 103224026 A | 7/2013 |
| CN | 203039518 U | 7/2013 |
| CN | 104760704 A | 7/2015 |
| DE | 102011086497 A1 | 5/2013 |
| EP | 3415436 A1 | 12/2018 |
| FR | 2692064 A1 | 12/1993 |
| GB | 2455374 A | 6/2009 |
| JP | S48088255 U | 10/1973 |
| JP | S56048952 | 11/1981 |
| JP | H0712088 A | 1/1995 |
| JP | 2004126800 A | 4/2004 |
| JP | 2009297449 A | 12/2009 |
| JP | 2010095246 A | 4/2010 |
| JP | 2011211025 A | 10/2011 |
| JP | 2012037204 A | 2/2012 |
| WO | 2007052246 A1 | 5/2007 |
| WO | 2008147484 A2 | 12/2008 |
| WO | 2008147484 A3 | 2/2009 |
| WO | 2009153588 A1 | 12/2009 |
| WO | 2010070717 A1 | 6/2010 |
| WO | 2012012752 A2 | 1/2012 |
| WO | 2012012752 A9 | 6/2012 |
| WO | 2013140085 A1 | 9/2013 |
| WO | 2013148123 A1 | 10/2013 |
| WO | 2014064431 A2 | 5/2014 |
| WO | 2014068982 A1 | 5/2014 |
| WO | 2014080409 A1 | 5/2014 |
| WO | 2014064431 A3 | 7/2014 |
| WO | 2017064202 A1 | 4/2017 |
| WO | 2018156991 A1 | 8/2018 |

OTHER PUBLICATIONS

Bullock et al., "Analysis of the Use of Digital Road Maps in Vehicle Navigation," 1994, IEEE, p. 494-501 (Year: 1994).

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Hawas et al., "Infrastructureless Inter-Vehicular Real-Time Route Guidance," 2008, IEEE, p. 1213-1219 (Year: 2008).

Ivan Barajas, "Parrot Unveils New Drone and Controller," May 14, 2014; https://blog.newegg.com/parrot-unveils-drone-controller-oculus-compatible/, accessed Dec. 21, 2016.

Kais, Mikael et al., "An Intelligent architecture for automated transportation in our cities", 2001 European Control Conference (ECC), Porto, Portugal, Sep. 4-7, 2001, pp. 277-282 (Year: 2001).

Kladis et al., "Event-Based Energy Optimum Route Planning in the Context of Unmanned Aerial Vehicles for Multi-Objective Exploration Missions," 2009, IEEE, p. 1281-1286 (Year: 2009).

(56) References Cited

OTHER PUBLICATIONS

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.
Microchip Technology Inc. AT42QT1010 Data Sheet. Copyright © 2017 Microchip Technology Inc. 30 pages.
MicroPilot home page, https://www.micropilot.com/; archived on Jan. 3, 2013 by Internet Archive, http://web.archive.org/web/2013103180733/http://www.micropilot.com/?, accessed May 2, 2016.
Mike Murphy, "Google wants to deliver packages from self-driving trucks," published Feb. 9, 2016, URL: https://qz.com/613277/google-wants-to-deliver-packages-from-self-driving-trucks/, 4 pages.
Nanohawk Aeraccess: "Unmanned Aerial Vehicle—Aeraccess—Nanohawk—Webarchive 20190616", Jun. 16, 2019 (Jun. 16, 2019), pp. 1-3, XP055759013,URL: https://web.archive.org/web/20190616235755/http://www.aeraccess-group.com/product/indoor/nanohawk [Retrieved from the Internet: Dec. 10, 2020]; the whole document.
Navaravong et al., "Formation Reconfiguration for Mobile Robots with Network Connectivity Constraints," 2012, IEEE, p. 18-24 (Year: 2012).
Norman Chan, "Hands-On with Parrot's Bebop Drone Quadcopter", tested.com, May 12, 2014; http://www.tested.com/tech/robots/461148-parrots-bebop-drone-what-you-should-know/, accessed Dec. 22, 2016.
Parent, Michel et al., "Intelligent Transportation in Cities with CTS", The IEEE 5th International Conference on Intelligent Transportation Systems, Sep. 3-6, 2002, Singapore, pp. 826-830 (Year: 2002).
rchelicopterfun.com, "Parrot AF Drone Quadcopter Review", http://www.rchelicopterfun.com/parrot-ar-drone.html; archived on Mar. 27, 2012 by Internet Archive, http://web.archive.org/web/20120327140509/http://www.rchelicopterfun.com/parrot-ar-drone.html, accessed Apr. 27, 2016.
Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.
Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.
URL: https://web.archive.org/web/20160804001046/https://www.starship.xyz/, download date: Aug. 4, 2016, 21 pages.
Wang, David. Application Report: FDC1004: Basics of Capacitive Sensing and Applications. SNOA927A—Dec. 2014—Revised Jun. 2021. Copyright © 2021 Texas Instruments Incorporated. 12 pages.
Wikipedia, "Apollo Abort Modes", https://en.wikipedia.org/wiki/Apollo_abort_modes; archived by Internet Archive on Aug. 16, 2012, https://web.archive.org/web/20120816115115/https://en.wikipedia.org/wiki/Apollo_abort_modes; accessed Jul. 9, 2019 (Year: 2012).
Wikipedia, "Space Shuttle Abort Modes," https://en.wikipedia.org/wiki/Space_Shuttle_abort_modes; archived by Internet Archive on Aug. 15, 2012, https://web.archive.org/web/20120815031221/https://en.wikipedia.org/wiki/Space_Shuttle_abort_modes; accessed Jul. 9, 2019 (Year: 2012).
Wikipedia, "Ramer-Douglas-Peucker Algorithm," www.wikipedia.com, Wikipedia: The Free Encyclopedia, 5 pages, Aug. 18, 2022, URL: https://en.wikipedia.org/wiki/Ramer%E2%80%93Douglas%E2%80%93Peucker_algorithm, obtained via web.archive.org on Jan. 6, 2023.

* cited by examiner

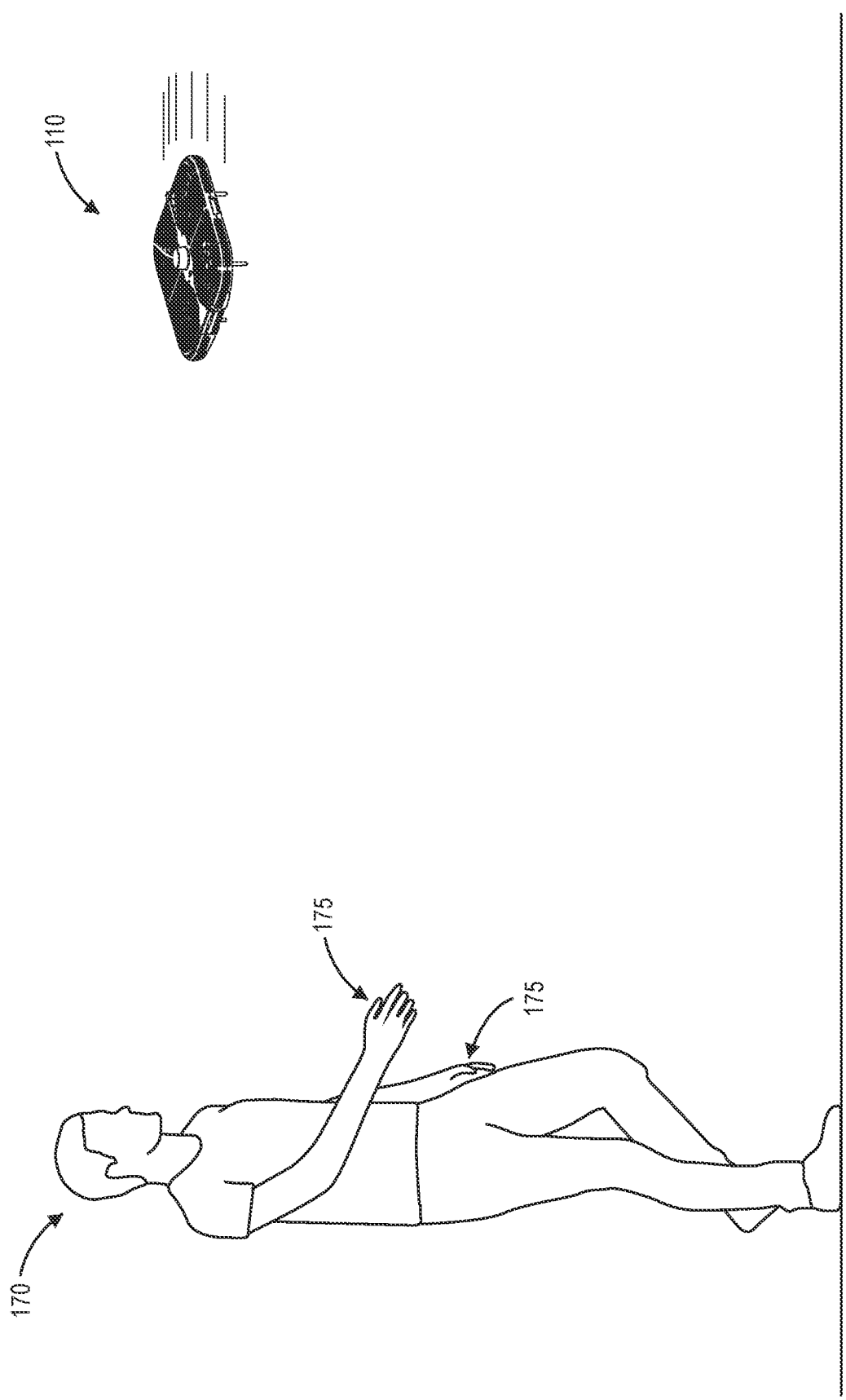

AERIAL VEHICLES WITH PROXIMITY SENSORS FOR SAFETY

BACKGROUND

Aerial vehicles are most commonly operated in outdoor spaces. An aerial vehicle operating outdoors may determine a position in three-dimensional space using a position sensor, e.g., a Global Positioning System ("GPS") receiver that captures signals from one or more satellites or other sources, as well as an inertial measurement unit (or "IMU"), one or more altimeters, barometers, or other components. An aerial vehicle operating outdoors may further detect hazards such as fixed or moving objects using any number of onboard sensors, e.g., cameras, time-of-flight sensors, acoustic sensors, or the like. An aerial vehicle operating outdoors may also typically climb above any detected hazards by increasing altitude, in order to elevate above ground-based or airborne obstacles, which may include humans or other animals, or other stationary or moving objects, or turn away from such obstacles. Because objects that are encountered outdoors, such as structures, plant life, or others, are often separated by comparatively large distances, and because outdoor spaces are typically sufficiently large, an aerial vehicle is typically able to make wide, smooth changes in course or altitude without risking contact with any obstacles, even where the aerial vehicle is operating at or near its maximum speeds.

Operating an aerial vehicle, or drone, within indoor spaces presents a unique set of challenges for the aerial vehicle, and creates unique risks for occupants or contents of the indoor spaces. Indoor spaces are commonly occupied by humans or other animals, who may approach an operating aerial vehicle with interest or intrigue, or with a lack of awareness of safety risks that may be posed by rotating motors and propellers, and attempt to extend one or more hands, fingers or other body parts into contact with such motors or propellers. For example, because indoor spaces are commonly constrained by floors and ceilings that are separated by distances of three meters or less, and feature narrow hallways or other passageways, along with limited operating areas between floors and ceilings, an aerial vehicle that operates indoors may be physically inhibited from making turns or changes in altitude that may be necessary in order to avoid intentional or inadvertent contact with advancing humans or other animals.

BRIEF DESCRIPTION OF THE DRAWINGS

FIGS. 1A through 1G are views of aspects of one aerial vehicle in accordance with embodiments of the present disclosure.

DETAILED DESCRIPTION

As is set forth in greater detail below, the present disclosure is directed to systems, such as aerial vehicles (e.g., drones), having proximity sensors for safety. More specifically, the systems and methods of the present disclosure include proximity sensors provided in selected locations on surfaces of systems, such as serial vehicles, that are configured to detect the presence of one or more body parts of humans or other animals. Such systems may include capacitive sensors having conductive components, e.g., electrodes, that are provided in selected locations on surfaces of the systems, such as on protective grates or other features provided over or near rotating or otherwise moving equipment, such as motors or propellers. The capacitive sensors may be configured to sense levels of capacitance of such components and, upon detecting a change in any of the levels of capacitance, a system may determine whether the detected change exceeds one or more thresholds, or otherwise indicates that a body part of a human or another animal is within a proximity of the system, and execute one or more actions accordingly. Such actions may include, for example, ceasing or changing operations of one or more moving components of the system (e.g., motors or propellers), causing the system to travel to another location, or any other actions. Alternatively, such actions may include the generation of one or more visual cues or audible cues, for example, by causing one or more lights to be illuminated, or causing one or more sounds to be emitted, independently or along with other actions. Where such moving components include propellers or other bladed objects, the systems and methods of the present disclosure may minimize or eliminate the risk of contact between such objects and any humans or other animals.

Figure 1A:
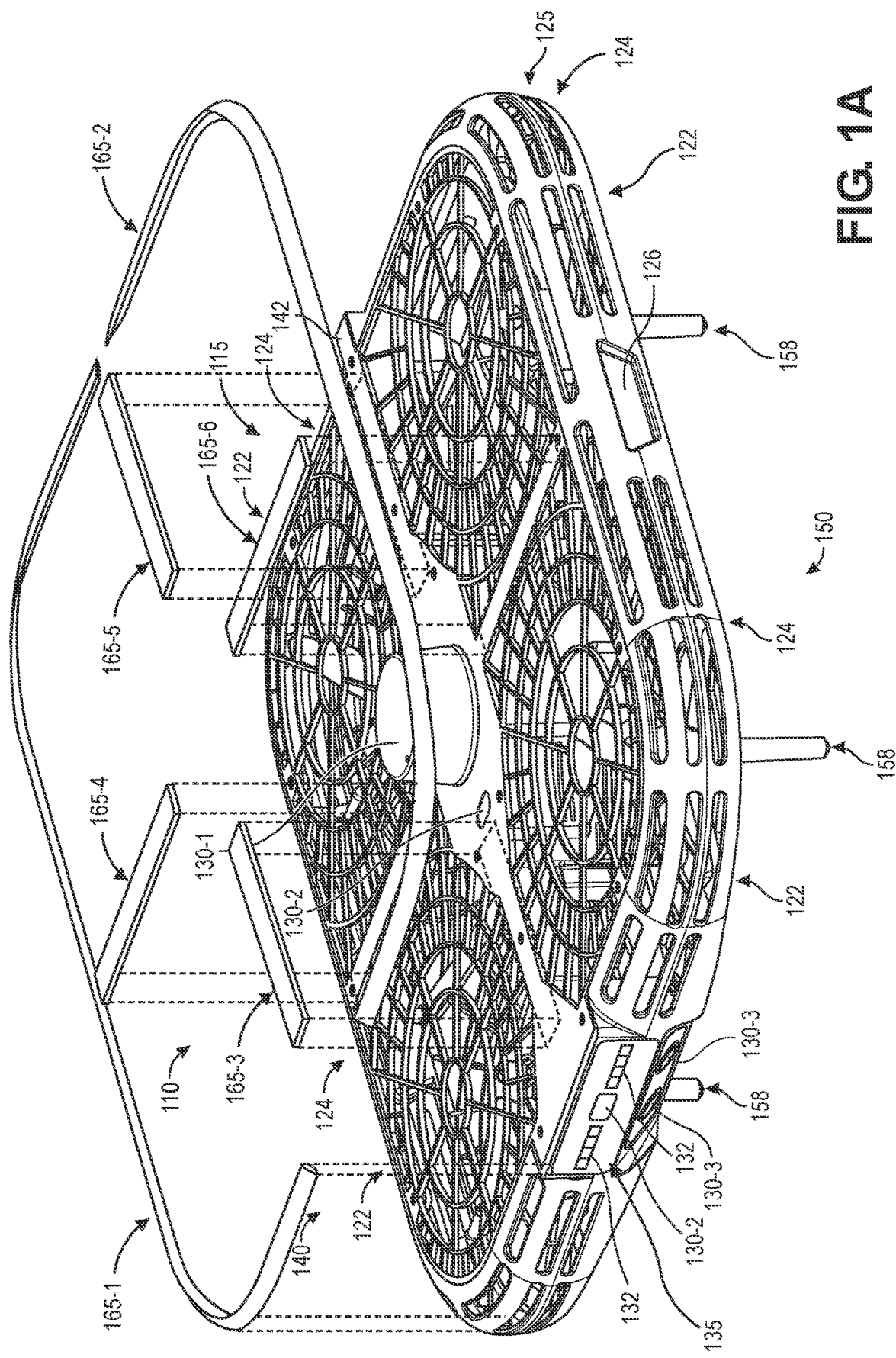
Figure 1B:
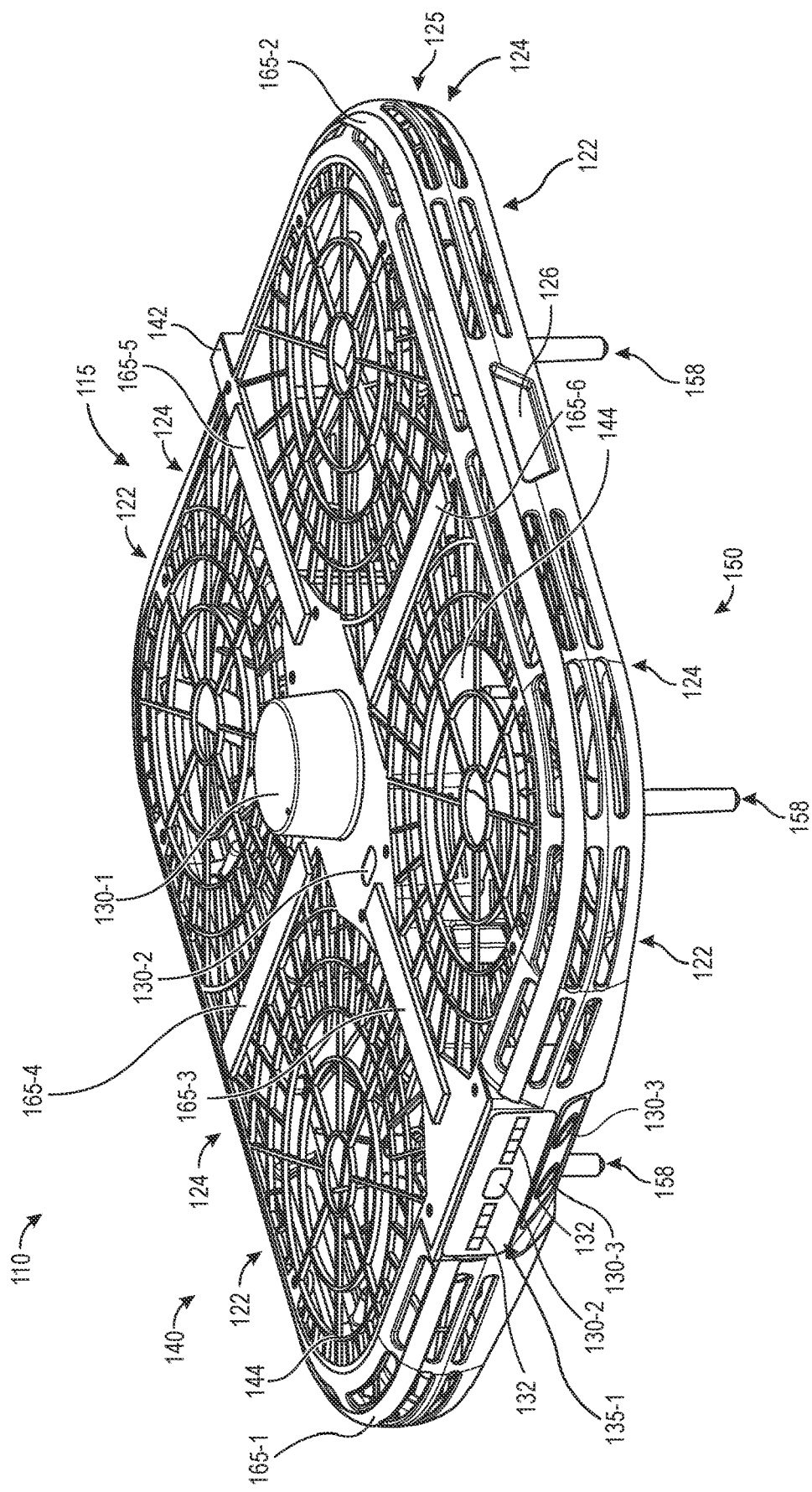

Referring to FIGS. 1A through 1G, views of aspects of one aerial vehicle 110 in accordance with embodiments of the present disclosure are shown. FIG. 1A is an exploded view of components of the aerial vehicle 110 from an upper perspective view. FIG. 1B is a lower perspective view of the aerial vehicle 110.

The aerial vehicle 110 includes a housing 115 and a plurality of conductive components 165-1, 165-2, 165-3, 165-4, 165-5, 165-6 applied to surfaces of the housing 115. Each of the conductive components 165-1, 165-2, 165-3, 165-4, 165-5, 165-6 may operate as a sense electrode for one or more capacitive sensing systems.

The housing 115 includes an upper section 140 and a lower section 150 that mate together at a shroud (or a side section) 125 provided around a perimeter of the aerial vehicle 110. The housing 115 may be formed by joining or mounting components of the upper section 140, components of the lower section 150 and components of the shroud 125 to one another by any number of clips, screws, bolts, snap-fit connections, or any other features.

The aerial vehicle 110 further includes one or more chambers 135 for accommodating one or more other sensors, control systems, illuminators, speakers, processors, circuitry or other components. The chambers 135 may be provided in any location with respect to the housing 115, e.g., within a cavity or an enclosure defined by the housing 115, at a perimeter of the housing 115, or in any other location, e.g., on or incorporated into the upper section 140 or the lower section 150. Alternatively, the aerial vehicle 110 may include any number of other chambers or other portions for accommodating one or more sensors, control systems, processors, circuitry or other components. Such chambers or portions may be provided in any location or orientation with respect to the housing 115 or the aerial vehicle 110 as a whole. In some implementations, components of the capacitive sensing system, such as capacitors, circuits, resistors, connectors or others, may be provided within one or more of such chambers 135, or elsewhere within the housing 115 or any other portion of the aerial vehicle 110.

The upper section 140 and the lower section 150 define a cavity or an enclosure having a plurality of propulsion motors 122 disposed therein. Each of the propulsion motors 122 may be mounted within the housing 115, e.g., to an arm or another extension, or to any other surface. The propulsion motors 122 may be powered by electricity or any other fuel source or prime mover, and each of the propulsion motors 122 is coupled to a propeller 124. The propulsion motors 122 may be capable of generating sufficient rotational speeds of the propellers 124 to provide thrust and/or lift forces to the aerial vehicle 110 and any payload engaged thereby. Moreover, in some implementations, the propellers 124 may be formed from a single-piece construction, and with rigid blades of fixed dimensions. Alternatively, in some other implementations, one or more of the propellers 124 may have a foldable construction defined by one or more hinges, such that the propellers 124 may be folded into a reduced length or size when the propellers 124 are not rotating under power, or extended to a full length or size when operating under power. Furthermore, where one or more of the propellers 124 has a foldable construction, e.g., with blades having one or more hinges, in the event that an object contacts one of the propellers 124 during operation, that propeller 124 may deflect or fold in response to contact with the object. Such hinges may be provided at or near a hub of the propeller 124, or at any other location along the blades of the propeller 124.

As is shown in FIGS. 1A and 1B, the housing 115 has a substantially square cross-section, e.g., a substantially planar cross-section in the shape of a square with rounded corners or edges, or a squircle, with a substantially constant height. Moreover, as is further shown in FIGS. 1A and 1B, a length and a width of the housing 115 are each substantially greater than a height of the housing 115. In some implementations, a ratio of the length or the width of the housing 115 to the height of the housing 115 may be approximately six-to-1, or 6:1. For example, in some implementations, the housing 115 may have a length and a width of approximately twenty-five centimeters, or approximately twelve inches, and a height of approximately five centimeters, or approximately two inches. Alternatively, the housing 115 may have cross-sections of any other sizes or shapes, e.g., rectangles other than squares, triangles, or any other polygons, or circles or any other curvilinear shapes, and may have any dimensions.

As is shown in FIGS. 1A and 1B, each of the upper section 140, the lower section 150 and the shroud 125 has a meshed or mesh-like construction, e.g., with a plurality of slats aligned longitudinally about a perimeter of the shroud 125, to reduce an overall mass of the aerial vehicle 110. The upper section 140 includes an upper frame 142 having a plurality of mesh sections mounted thereto. The upper frame 142 has a cross-shaped construction with a pair of members aligned orthogonally with respect to one another and joined near a geometric center of the housing 115. As is shown in FIGS. 1A and 1B, mesh sections of the upper frame 142 may each be defined by a radially oriented lattice structure that includes a central opening defined by an inner ring or another circular object. Each of the mesh sections of the upper frame 142 may further include a plurality of spokes extending radially outward from a central opening, as well as a plurality of other concentric rings having radii that are progressively larger than the central opening. The spokes may have any angular separation from one another, e.g., forty-five degrees, or any fraction thereof, e.g., 11.25 degrees, or one-fourth of forty-five degrees. Moreover, a central opening and any other concentric rings may have any radii or diameters. For example, in some implementations, a central opening may have a diameter of approximately one to two centimeters (1-2 cm), and the concentric rings may have progressively larger radii, e.g., approximately nine to ten millimeters (9-10 mm) from the inner ring defining the central opening or one another in a radial direction. An inner ring defining a central opening, the other concentric rings, or spokes extending from such rings may have cross-sections of any other shape or size, e.g., squares, rectangles, circles or others, and may have any dimensions, such as widths or diameters of one to one-and-one-half millimeters (1-1.5 mm) each, and any lengths.

As is further shown in FIGS. 1A and 1B, when the upper mesh sections 144 are mounted to the upper frame 142, central openings of each of the upper mesh sections 144 are coaxially aligned over one of the propulsion motors 122. Alternatively, in some implementations, the central openings may be aligned over any other portion of the propulsion motors 122, and need not be coaxially aligned over the propulsion motors 122.

The lower section 150 may also include a lower frame (not shown in FIG. 1A or 1B), a plurality of mesh sections (not shown in FIG. 1A or 1B) mounted to the lower frame, and a plurality of landing pegs (or struts, or feet) 158. The mesh sections may include constructions or features that are similar to the mesh sections of the upper section 140 shown in FIGS. 1A and 1B, or different from such constructions or features. For example, the mesh sections of the lower section 150 may have lattice structures that include central openings defined by rings or other objects and are oriented in any manner. The mesh sections of the lower section 150 may further include any number of spokes extending radially outward from such openings, as well as a plurality of other concentric rings having radii that are progressively larger than such openings. Such spokes may have any angular separation from one another, e.g., forty-five degrees, or any fraction thereof, e.g., 11.25 degrees, or one-fourth of forty-five degrees.

Moreover, openings of the lower section 150 may have any radii or diameters, e.g., a diameter of approximately one to two centimeters (1-2 cm), and concentric rings may have progressively larger radii, e.g., approximately nine to ten millimeters (9-10 mm) from an inner ring defining a central opening or one another in a radial direction. Rings defining openings of the lower section 150 may have cross-sections of any other shape or size, e.g., squares, rectangles, circles or others, and may have any dimensions, such as widths or diameters of one to one-and-one-half millimeters (1-1.5 mm) each, and any lengths.

The landing pegs 158 may be any extensions or appurtenances extending below the lower section 150 that enable the aerial vehicle 110 to complete a landing evolution on any substantially flat surface. For example, the landing pegs 158 may have lengths that extend below a lowest point of the housing 115 or any chambers extending beneath the lower section 150, and ends that are aligned in a common plane, such that the aerial vehicle 110 may land on a substantially flat landing surface with each of the ends of the landing pegs 158 in contact with the landing surface, and without requiring any other portion of the aerial vehicle 110 to contact the landing surface. The landing pegs 158 may also assist or guide the aerial vehicle 110 when landing into or onto a docking station (e.g., a dock) or other system. For example, in some implementations, a docking station may include one or more portions having holes or other openings that correspond to or may accommodate the extensions or appurtenances therein.

The landing pegs 158 may be constructed and coupled to the housing 115 in any manner. For example, in some implementations, the landing pegs 158 may be discrete components that are fastened or otherwise joined or affixed to undersides of support members of the lower section 150, or to undersides of mesh sections of the lower section 150. Alternatively, the landing pegs 158 may be formed as integral parts of the lower section 150, e.g., mesh sections, arms of chambers to which the propulsion motors 122 are joined, or to undersides of the propulsion motors 122 themselves, and extend downward therefrom along common rotational axes of shafts or other portions of the propulsion motors 122, or in any other location or orientation with respect to any aspects of the propulsion motors 122.

The shroud 125 may be a single component, or a plurality of components, provided about a perimeter of the housing 115, and which joins the upper section 140 and the lower section 150 to form the housing 115. The shroud 125 may have a shape that generally defines the shape of the cross-section of the housing 115, e.g., a rounded square, or a squircle. As is shown in FIGS. 1A and 1B, the shroud 125 may be formed with a meshed or mesh-like construction, with one or more perforations, holes or other openings that may reduce an overall mass of the shroud 125. Alternatively, the shroud 125 may be formed with a substantially solid construction, e.g., without any perforations, holes or other openings.

The shroud 125 further includes a pair of indentations 126 on opposite sides of the aerial vehicle 110. The indentations 126 may be sized and oriented to accommodate one or more fingers of a hand, thereby enabling a human operator to hand-carry or otherwise manually transport the aerial vehicle 110 by grasping the shroud 125 and inserting one or more fingers into each of the indentations 126. Although the aerial vehicle 110 of FIGS. 1A and 1B includes only a pair of indentations 126, aerial vehicles may include any number of indentations or other openings for manually transporting the aerial vehicles in accordance with implementations of the present disclosure, and such indentations may have any shape or size.

As is shown in FIG. 1A, the aerial vehicle 110 also includes a LIDAR sensor 130-1 (or a LIDAR sensor module) having a portion that extends above the housing 115, e.g., through a substantially circular hole (or bore, or other opening) at a geometric center or centroid, thereby enabling the upper frame 142 to be placed over the LIDAR sensor 130-1 and coupled to the shroud 125 or the lower section 150, with the hole or other opening encircled around or surrounding a circumference of the LIDAR sensor 130-1 in the upper frame 142.

In some implementations, the LIDAR sensor 130-1 may be configured to calculate distances to objects at an angular range of up to three hundred sixty degrees about the LIDAR sensor 130-1, and at any maximum measuring radius, e.g., twelve meters (12 m) or more. For example, in some implementations, the LIDAR sensor 130-1 may be configured to transmit light at any measurement frequency, e.g., up to 4,500 Hertz (or 4,500 measurements per second), and the transmitted light may be infrared light, or light at any other wavelength or frequency. In some implementations, the LIDAR sensor 130-1 may transmit light in a single direction, and capture or receive reflections of the light from one or more objects. In some other implementations, the LIDAR sensor 130-1 may be configured to transmit light along a first axis, e.g., normal to a yaw axis of the aerial vehicle 110, and to rotate the first axis about a second axis, e.g., along or parallel to the yaw axis of the aerial vehicle 110. The LIDAR sensor 130-1 may further combine distances calculated based on times-of-flight with information regarding angles at which the light was emitted and received to generate a point cloud or another representation of positions of objects, which may be stored by the aerial vehicle 110 and processed or transmitted to one or more external devices or systems for processing. The LIDAR sensor 130-1 may also include one or more motor drivers or other components for controlling a start, a stop or a speed of a motor, and may generate and transmit packets of data including any information regarding transmissions or returns, e.g., rotational speeds, start or end angles, time stamps, or other related data. Point clouds or other sets of distance or position information captured by the LIDAR sensor 130-1 may be utilized to construct an environment map (e.g., a physical map) of an indoor space in which the aerial vehicle 110 operates, or for any other purpose.

As is also shown in FIG. 1A, the aerial vehicle 110 also includes a time-of-flight sensor 130-2 having a field of view or orientation that extends normal to the upper frame 142 of the upper section 140, e.g., in a vertically upward direction above the aerial vehicle 110. The time-of-flight sensor 130-2 may be provided in association with the upper frame 142 or another component or surface of the aerial vehicle 110, and configured to transmit light within a substantially pyramidal field of view having a fixed axis or direction relative to one or more principal axes of the aerial vehicle 110. The time-of-flight sensor 130-2 may transmit and receive light within the pyramidal field of view, which may be defined by any angle, e.g., approximately forty-five degrees, or any other angle. For example, in some implementations, the aerial vehicle 110 may interpret any received light in a map defined by a grid having a plurality of cells arranged in rows and columns, e.g., a grid of sixteen cells in four rows and four columns (or a 4×4 grid), or a grid of sixty-four cells in eight rows and eight columns (or an 8×8 grid), or any other numbers of rows and columns. Where the time-of-flight sensor 130-2 transmits light, and receives points (or returns or detections) of the transmitted light reflected off one or more surfaces, the aerial vehicle 110 may calculate a number of the points within any given cell of the cells of the grid, and calculate a confidence score in such points (or returns or detections). The numbers of points and the confidence scores may be calculated for each of such cells at any rate or frequency, e.g., ten hertz (10 Hz), one hundred hertz (100 Hz), or any other rate or frequency, based on points received by the time-of-flight sensor 130-2. Upon receiving data regarding one or more returns of reflections of the transmitted light, the time-of-flight sensor 130-2 may determine a distance to the object, based on an elapsed time between the transmission and the return, or in any other manner.

The aerial vehicle 110 further includes another time-of-flight sensor 130-2 (or a time-of-flight sensor module) having a field of view that extends normal from a substantially flat face and is aligned at an edge of the housing 115, e.g., radially outward from the shroud 125 and within a cross-section of the housing 115. The time-of-flight sensor 130-2 may capture data and determine ranges to objects forward of the aerial vehicle 110 based on the captured data in a manner similar to that described above with respect to the time-of-flight sensor 130-2 provided in association with the upper section 140 and described above.

The aerial vehicle 110 also includes a pair of sets of illuminators 132, with each of the sets of illuminators 132 aligned in a common line. The sets of illuminators 132 may include one or more light-emitting diodes (or "LED"), incandescent bulbs, compact and/or linear fluorescent bulbs, halogen lamps, metal halide lamps, neon lamps, sodium lamps or any other type or form of lights configured to project visible light at any frequency, wavelength or intensity during operations of the aerial vehicle 110. For example, in some implementations, each of the sets of illuminators 132 may include a plurality of white lights. Alternatively, the sets of illuminators 132 may include one or more lights in colors other than white.

The aerial vehicle 110 also includes a pair of cameras 130-3 (or camera modules, or other imaging devices of any type or form). The cameras 130-3 have fields of view with axes of orientation extending normal from another substantially flat face of the chamber 135 that is angled in a downward direction with respect to the housing 115, e.g., below the cross-section of the housing 115, or otherwise aligned at a non-parallel angle with respect to the other substantially flat face of the chamber 135. Alternatively, either or both of the cameras 130-3 may be aligned with fields of view or axes of orientation extending in any direction or orientation with respect to the aerial vehicle 110, e.g., forward, aft, port, starboard, up, down, or in any other direction, or the yaw, pitch or roll axes of the aerial vehicle 110, or at any other angle or orientation. The cameras 130-3 may be aligned with fixed orientations, or with variable orientations (e.g., rotating or shifting orientations).

Each of the cameras 130-3 may be configured to capture visual imaging data or depth imaging data with respect to objects or features that are present within their respective fields of view. In some implementations, depth imaging data captured by the cameras 130-3 may be interpreted to detect objects within an indoor space, to calculate distances or ranges to such objects, or to identify boundaries, edges or other features of such objects. In some implementations, visual imaging data captured by the cameras 130-3 may likewise be processed to identify or detect one or more boundaries or other features of objects, e.g., based on one or more edges, contours, outlines, colors, textures, silhouettes, shapes or other characteristics of objects depicted within the visual imaging data.

Depth imaging data and/or visual imaging data captured by either of the cameras 130-3 may be utilized for any purpose. In some implementations, the depth imaging data and/or visual imaging data may be processed to construct an environment map (e.g., a physical map) of an indoor space, or to select courses, speeds or altitudes for avoiding objects within the indoor space. In some implementations, the depth imaging data and/or visual imaging data may be processed to determine information regarding any events or conditions that may be occurring within an indoor space, or to identify such events or conditions. In some implementations, the depth imaging data and/or visual imaging data may be captured, processed or stored by one or more components of the aerial vehicle 110. In some other implementations, however, the depth imaging data and/or visual imaging data may be transmitted to one or more external systems that may be provided within an indoor space where the aerial vehicle 110 operates, or on or in one or more alternate or virtual locations, such as in a "cloud"-based environment. Imaging data captured by either of the cameras 130-3 may be utilized for visual-inertial odometry (or "VIO"), for monitoring or evaluating conditions within an indoor space, or for any other purpose. In some implementations, one or more of the cameras 130-3 may be an electronic shutter camera, a global shutter camera, a rolling shutter camera, or any other type or form of camera. In some implementations, imaging data captured by one or more of the cameras 130-3 may be continuously streamed to one or more external devices or systems, or processed and stored for any purpose.

Furthermore, in some implementations, the cameras 130-3 may have fields of view that are generally oriented in a common direction and substantially overlap. In some implementations, one of the cameras 130-3 may be a visual camera (e.g., a color camera) that may be used to capture images that are encoded as video files and transmitted to a remote system for streaming to a user device. In some other implementations, one of the cameras 130-3 may be a global shutter visual graphics array (or "VGA") camera (e.g., a grayscale camera) having an infrared-cut filter, e.g., at 650 nanometers (or 650 nm), and a field of view of 166 degrees diagonal, 133 degrees horizontal, and 100 degrees vertical. Where one of the cameras 130-3 is a global shutter camera, the one of the cameras 130-3 may be configured to capture image frames at a rate of approximately thirty frames per second (or 30 fps), and such images may be used by the aerial vehicle 110 for visual simultaneous localization and mapping (or "SLAM"), or for any other purpose.

In addition to the LIDAR sensor 130-1, the time-of-flight sensors 130-2 and the cameras 130-3, the aerial vehicle 110 may further include any type or form of other sensors, or any number of such sensors. For example, in some implementations, the aerial vehicle 110 may include one or more speakers or ultrasonic sensors (or an ultrasonic sensor module) that are configured to transmit sound waves or pulses within an indoor space, and reflections of sound waves or pulses transmitted by the speakers or ultrasonic sensors within the indoor space may be captured and interpreted to calculate distances or directions from the aerial vehicle 110 to one or more objects within the indoor space based on times at which the sound waves or pulses were transmitted and received, and the speed of sound within the indoor space.

The various components of the housing 115, including but not limited to the upper section 140, the lower section 150, the chambers 135, the landing pegs 158 or others may be formed from any suitable materials, such as plastics (e.g., thermosetting plastics such as epoxy or phenolic resins, polyurethanes or polyesters, as well as polyethylenes, polypropylenes or polyvinyl chlorides, and also recycled plastics), wood (e.g., woods with sufficient strength properties such as ash), metals (e.g., lightweight metals such as aluminum, or metals of heavier weights including alloys of steel), composites (e.g., carbon fiber), rubbers, or any other combinations of materials.

For example, in some embodiments, the upper section 140, the lower section 150, the chambers 135, the landing pegs 158 or others may be formed from polycarbonates, acrylonitrile butadiene styrene (or "ABS"), a blend of polycarbonates and ABS, or any other suitable materials, e.g., plastic, wood, metal, composites, carbon fibers, rubbers, or any other suitable materials. The upper section 140, the lower section 150, the chambers 135, the landing pegs 158 or others may be further formed from any number of portions, pieces or sections, such as one, two (viz., the upper section 140 or the lower section 150), or more.

The aerial vehicle 110 may further include any number of processors, memory components or data stores, transceivers, or other processor-driven equipment (not shown), which may be maintained or stored within the housing 115, the chambers 135 or any other portion of the aerial vehicle 110. The aerial vehicle 110 may be configured for communication via any number of wireless systems or protocols, including but not limited to wireless fidelity ("Wi-Fi"), Bluetooth, radio frequency identification (or "RFID"), near-field communication (or "NFC") readers, or any other type of systems or protocols.

The conductive components 165-1, 165-2, 165-3, 165-4, 165-5, 165-6 may have any size, shape or dimensions (e.g., lengths, widths or thicknesses), and may be formed from any suitable materials, including but not limited to copper, aluminum or any other conductive or semi-conductive materials. The conductive components 165-1, 165-2, 165-3, 165-4, 165-5, 165-6 may be applied to surfaces of the housing 115 in any manner, such as by one or more fasteners, such as clips, screws, bolts, snap-fit connectors, or any other like features, or one or more adhesives, such as glues, tapes or other materials.

For example, sizes, shapes or dimensions of the conductive components 165-1, 165-2, 165-3, 165-4, 165-5, 165-6 may be selected based on sizes, shapes or dimensions of portions of the housing 115 to which such components are joined, or on any other factors. In some implementations, a size, a shape, or a dimension of a conductive component may be selected to increase or decrease sensitivity of a capacitive sensing system, which may be defined or determined based on the size, the shape or the dimension of the conductive component, dielectric properties of the portions of the housing 115 to which the conductive component is joined, or any other factors. In some implementations, the portions of the housing 115 to which the conductive components 165-1, 165-2, 165-3, 165-4, 165-5, 165-6 are joined may be formed from any suitable materials, such as plastics, polyethylenes, woods or other features having comparatively high dielectric contents to aid in propagating fields, and to avoid reducing a field strength accordingly. In some implementations, such portions of the housing 115 may be formed in any manner, such as by injection molding around one or more of the conductive components 165-1, 165-2, 165-3, 165-4, 165-5, 165-6.

The conductive components 165-1, 165-2, 165-3, 165-4, 165-5, 165-6 may be provided in any location with respect to rotating or otherwise moving components of the aerial vehicle 110, e.g., the motors 122 and the propellers 124. For example, in some implementations, such as is shown in FIGS. 1A and 1B, the conductive components 165-1, 165-2, 165-3, 165-4, 165-5, 165-6 may cover or otherwise be associated with any portion or share of the upper frame 142 or the upper section 140. Alternatively, or additionally, one or more conductive components may cover or otherwise be associated with any portion or share of the lower section 150.

In some implementations, conductive components may be integral portions of the upper section 140 or the lower section 150. For example, in some implementations, conductive components may be included in rings or other features defining a central opening, spokes or other portions of a lattice structure provided above or near the motors 122 or the propellers 124.

Figure 1C:
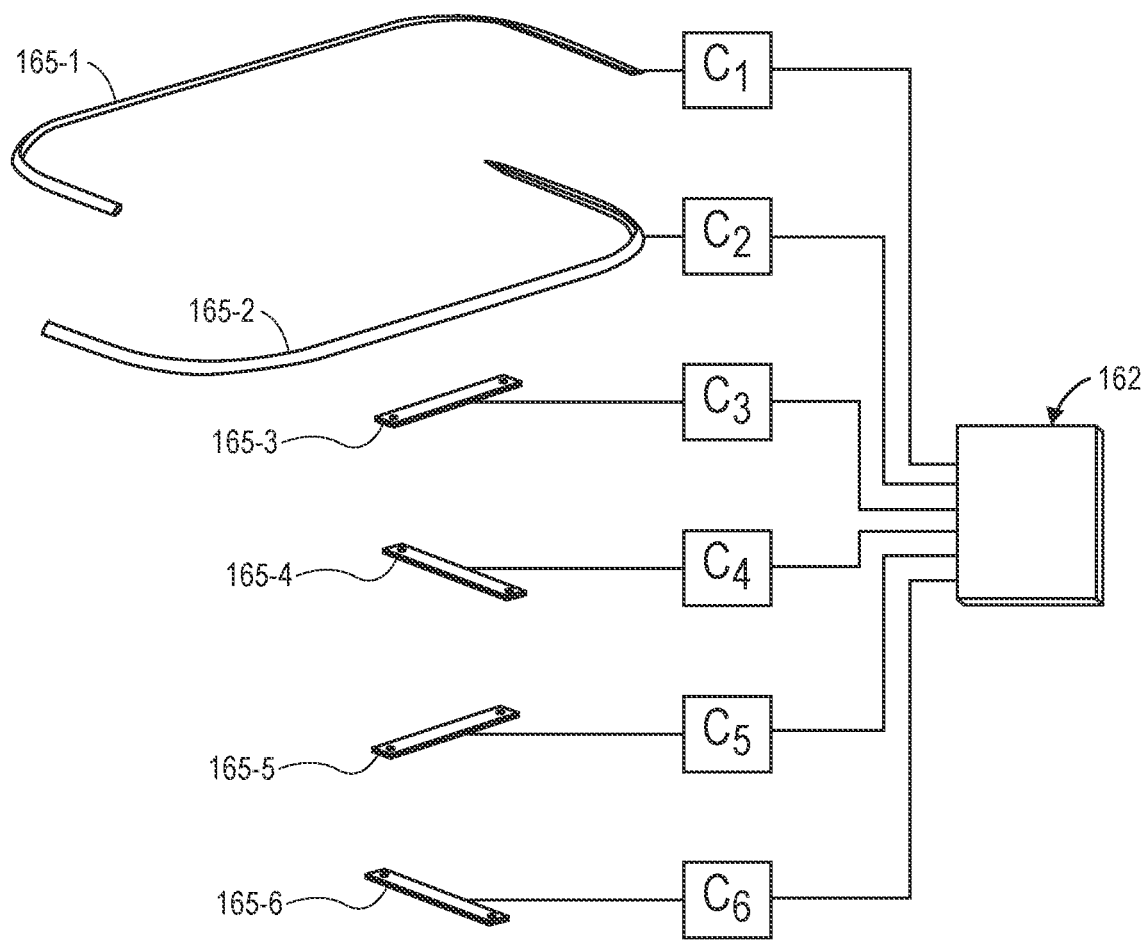

Conductive components provided on surfaces of systems, e.g., the aerial vehicle 110, may be linked or coupled to one or more features of a capacitive sensing system, which may include one or more circuits, resistors, capacitors, voltage sources, connections to ground or others. The capacitive sensing system may be configured to determine levels of capacitance on the conductive components. As is shown in FIG. 1C, each of the conductive components 165-1, 165-2, 165-3, 165-4, 165-5, 165-6 is coupled to a circuit 162 of a capacitive sensing system. The circuit 162 may include any number of components, such as a small outline transistor (or "SOT"), that may be mounted to any number of boards or other features provided in association with the aerial vehicle 110, e.g., within the housing 115, the chambers 135, or any other portion. For example, in some implementations, the conductive components 165-1, 165-2, 165-3, 165-4, 165-5, 165-6 may be connected to respective transistors of the circuit 162 by way of one or more conductors, and such transistors may be aligned to generate output signals representative of levels of capacitance on the respective components 165-1, 165-2, 165-3, 165-4, 165-5, 165-6, or changes in any of such levels. The circuit 162 may be further configured to determine whether any of such levels or changes in such levels exceed or fall below any thresholds or limits, or otherwise violate any rules or requirements of operation. The circuit 162 may further include one or more resistors, capacitors, voltage sources, or other features for selecting or designating sensitivities of the circuit 162. Output signals generated by the circuit 162 may be provided to a control system of the aerial vehicle 110 (not shown), which may interpret such signals and execute any number of instructions accordingly to operate any of the motors 122, or vary operations of any of such motors 122, e.g., to start or stop such motors 122, or increase or decrease speeds of such motors 122.

In accordance with one or more implementations of the present disclosure, an integrated circuit component may be coupled to one or more conductive components that are operating as a sense electrodes. In particular, a conductive component may be coupled to a first terminal of an integrated circuit component using a first line. A capacitor may be coupled to the first line, and also to a second terminal of the integrated circuit component. The integrated circuit component may be configured to determine a change in capacitance of a system including the conductive component that was caused by introduction of a new object, e.g., a human hand or finger, nearby.

Various characterizations may be utilized for such a system. In some implementations, a conductive component may act or be characterized as a sense electrode for a capacitive touch sensor system. In such implementations, capacitance measured using a sense electrode may be characterized as "self-capacitance." Alternatively, a conductive component may act as one half or "plate" of a capacitor system, with a ground plane representing the other half or "plate" of the capacitor system.

In some implementations of the present disclosure, movement of a finger closer to a conductive component of a capacitor system causes a change in an amount of charge that can be stored or held by the capacitor system at a given voltage level. For example, charged particles of a hand, a finger or another body part may have an impact on an electromagnetic field or photon field, which may in turn impact the amount of charge that can be stored or held by the capacitor system.

In some implementations of the present disclosure, an integrated circuit component is configured to determine a change in capacitance of a capacitor system comprising a conductive component by repeatedly charging and discharging a capacitor, and measuring an amount of time required to discharge the capacitor, e.g., to a voltage below a predetermined threshold.

In some implementations of the present disclosure, an integrated circuit component is configured to determine a change in capacitance of a capacitor system based on an output from a charging and discharging capacitor, which may be provided as an input to a first counter that counts a number of rising or falling edges during a predetermined or selected time period. If capacitance increases, e.g., based on a finger moving closer to a conductive component, a frequency of an output signal will decrease due to an increased amount of time required to discharge the capacitor, and a count of rising or falling edges may also decrease.

In some implementations of the present disclosure, a second counter may be utilized to determine whether a count threshold has been reached following a first count. If a count threshold is not reached within a set amount of time from a first count, the second counter may reset. Alternatively, an evaluation algorithm may be utilized to determine how many count events have occurred within a defined time period prior to a most recent count event. Upon determining that a count threshold has been reached, an integrated circuit component generates a signal indicating a change in capacitance above a threshold has been observed.

Figure 1E:
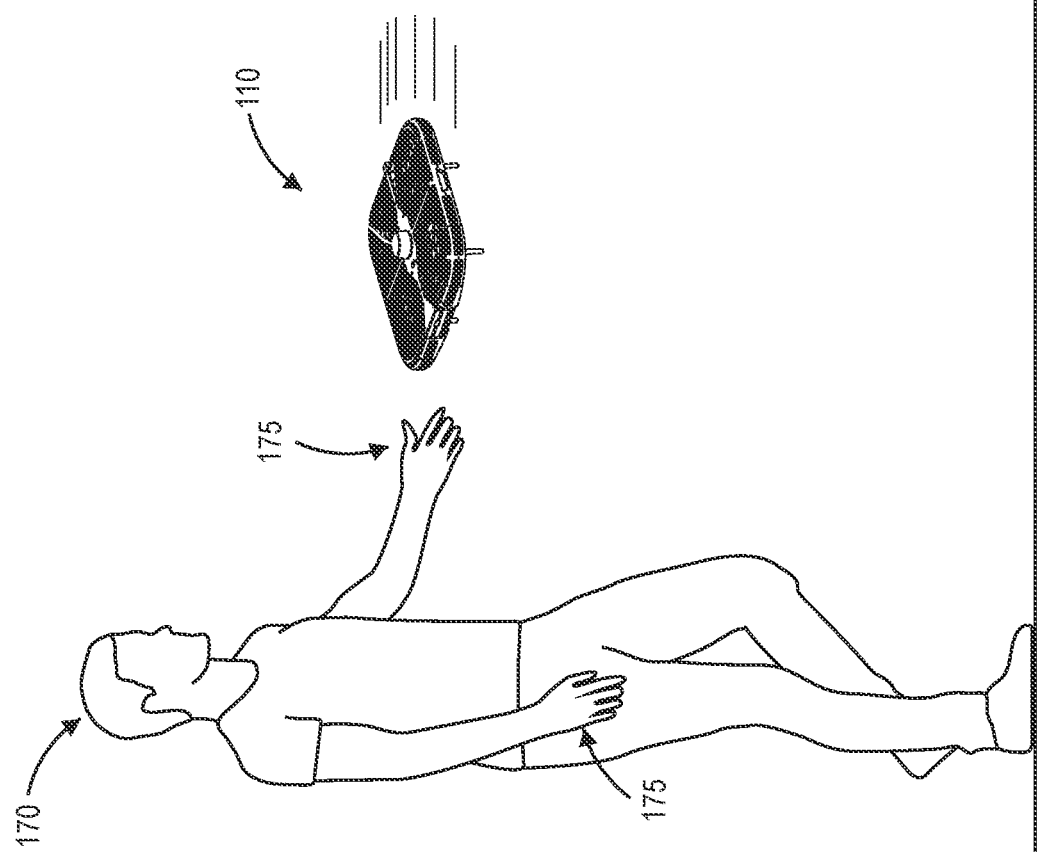

The systems and methods of the present disclosure may be used to detect a human or another animal within a proximity of an operating system, such as an aerial vehicle, based on changes in capacitance on one or more conductive components of a capacitive sensing system. As is shown in FIGS. 1D and 1E, the aerial vehicle 110 operates within an indoor space including a human 170 having a pair of hands 175. The aerial vehicle 110 may travel on a selected course, at a selected speed and at a selected altitude during the performance of one or more missions within the indoor space by operating one or more of the motors 122 and propellers 124. Such missions may include, but need not be limited to, capturing imaging data using one or more cameras, or any other information or data by any other sensors, and to determine whether any events or conditions are occurring or present within the indoor space, or to identify such events or conditions based on such data. Alternatively, the aerial vehicle 110 may operate in any space, e.g., in outdoor spaces. In some implementations, a system other than an aerial vehicle may include one or more of the systems or operate one or more of the methods disclosed herein. For example, one or more of the conductive components may be provided on surfaces of any system having rotating or otherwise moving parts, and may be configured to detect the presence of any humans or other animals based on changes in capacitance on any of such components.

Figure 1F:
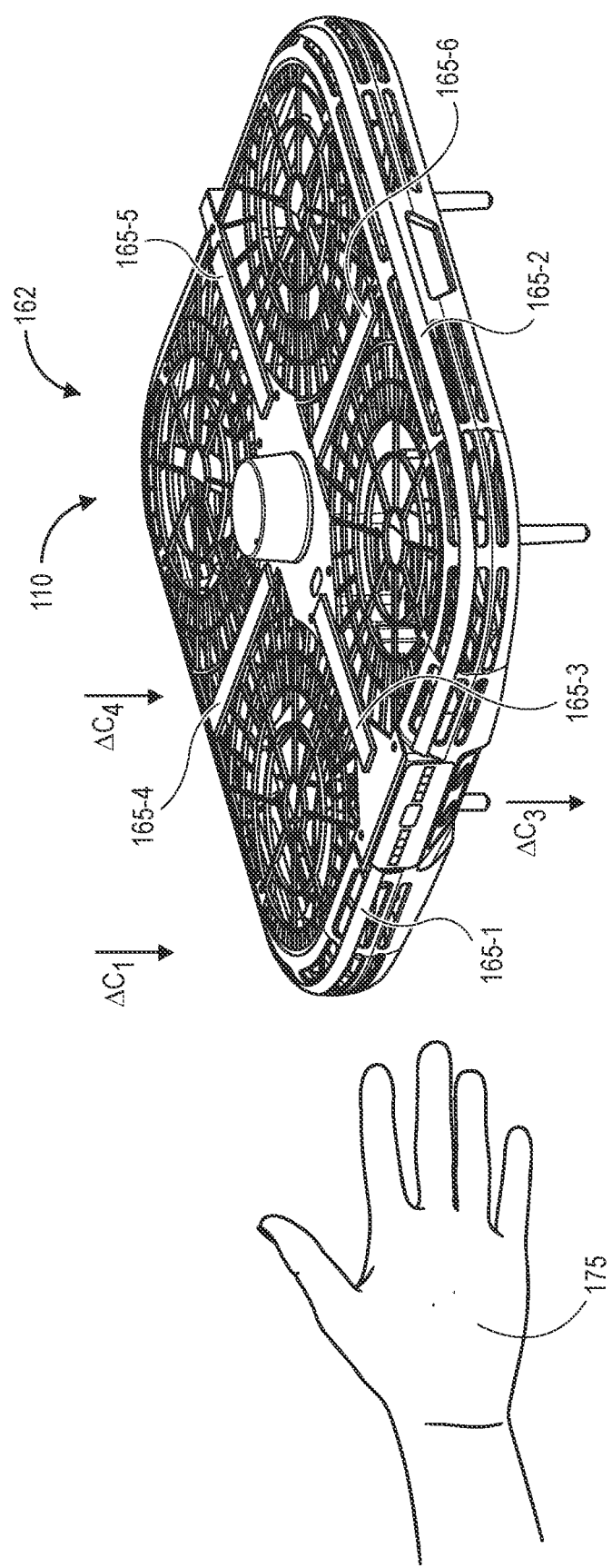

As is shown in FIG. 1E, the human 170 extends a hand 175 toward the aerial vehicle 110. As is shown in FIG. 1F, a range between the hand 175 and a corner of the aerial vehicle 110 decreases, as fingers or other body parts of the hand 175 approach the aerial vehicle 110. For example, the presence of the one or more fingers or body parts of the hand 175 may cause a level of capacitance on one or more of the conductive components 165-1, 165-3, 165-4 to increase or decrease as a function of distances between such fingers or body parts of the hand 175 and such components 165-1, 165-3, 165-4. In particular, as is further shown in FIG. 1F, as the hand 175 approaches the conductive components 165-1, 165-3, 165-4, the circuit 162 detects changes $\Delta C_1$, $\Delta C_3$, $\Delta C_4$ in levels of capacitance on one or more capacitors to which the respective components are coupled. Alternatively, the circuit 162 may further determine values of the levels of capacitance, or rates of change of the levels of capacitance on such components.

Figure 1G:
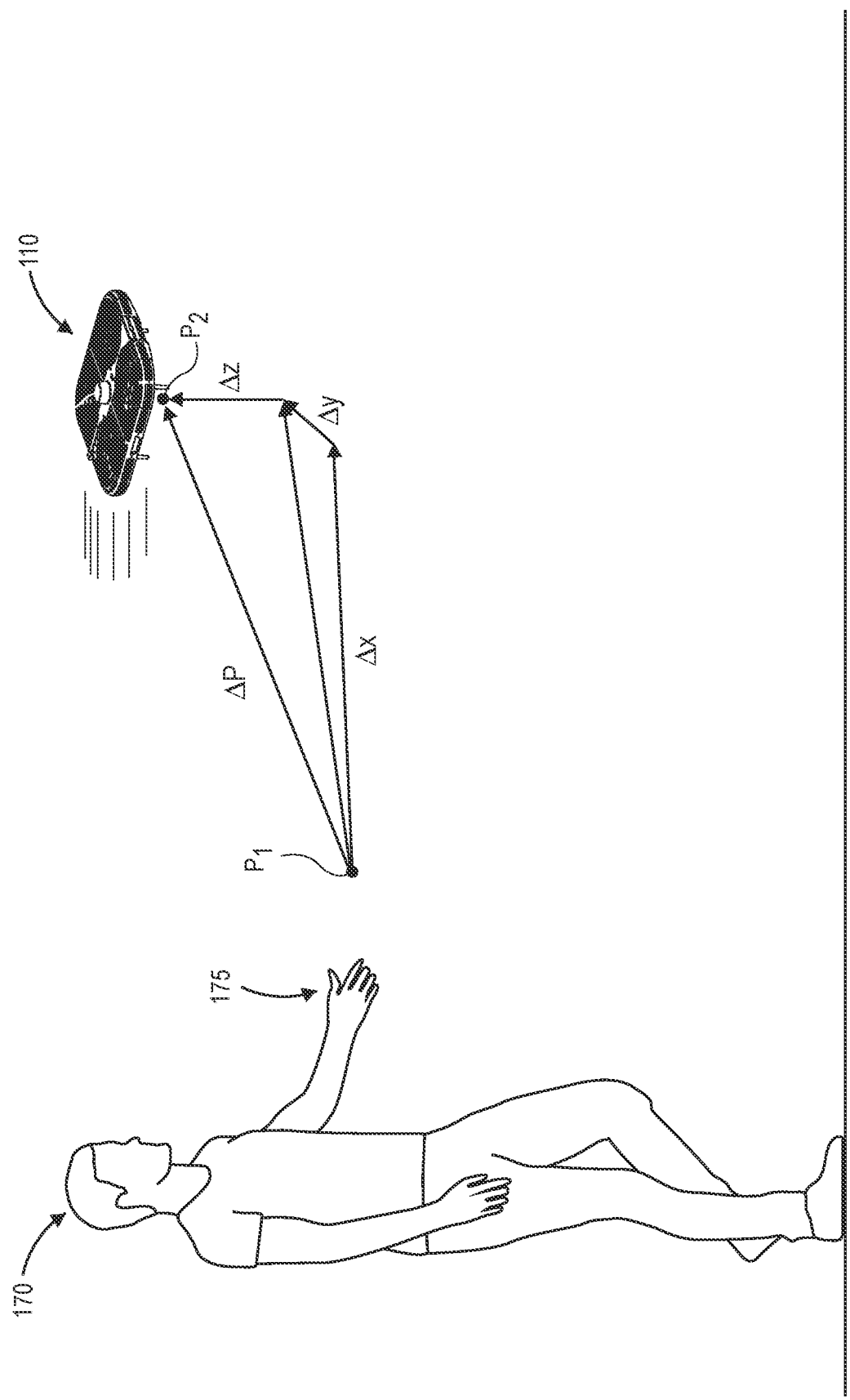

Upon determining that one or more of the changes $\Delta C_1$, $\Delta C_3$, $\Delta C_4$ in levels of capacitance, or the rates of change of such levels exceed a predetermined threshold, the circuit 162 may generate and transmit one or more signals to a control system of the aerial vehicle 110, which may then execute one or more actions in response to such signals. For example, as is shown in FIG. 1G, upon detecting the changes $\Delta C_1$, $\Delta C_3$, $\Delta C_4$, and determining that one or more changes exceeds a predetermined threshold, the aerial vehicle 110 may execute one or more sets of instructions for causing the aerial vehicle 110 to travel from a first position $P_1$ at which the changes were determined to a second position $P_2$ that is located at a safe distance, range or altitude above, away or from the human 170 and his or her hand 175. For example, the aerial vehicle 110 may be preprogrammed with one or more sets of instructions that, when executed, cause the aerial vehicle 110 to operate one or more of the motors 122 to generate lift and thrust to cause the aerial vehicle 110 to change its position by predetermined amounts (or distances) $\Delta x$, $\Delta y$, $\Delta z$ along one or more principal axes. Values of the amounts (or distances) $\Delta x$, $\Delta y$, $\Delta z$ may be selected on any basis, such as values of the changes $\Delta C_1$, $\Delta C_3$, $\Delta C_4$, or one or more safety factors, as well as any dimensions or features of the indoor spaces.

Alternatively, in some implementations, upon detecting the changes $\Delta C_1$, $\Delta C_3$, $\Delta C_4$, and determining that one or more changes exceeds a predetermined threshold, the aerial vehicle 110 may execute one or more sets of instructions to cause one or more of the motors 122 to immediately stop, e.g., to operate at a speed of zero, thereby causing the aerial vehicle 110 to descend in altitude, away from the position $P_1$. In some embodiments, while descending, the aerial vehicle 110 may sense the change in altitude and execute one or more sets of instructions to cause the motors 122 to reengage in operation once the aerial vehicle 110 is sufficiently far from the position $P_1$. As yet another alternative, upon detecting the changes $\Delta C_1$, $\Delta C_3$, $\Delta C_4$, and determining that one or more changes exceeds a predetermined threshold, the aerial vehicle 110 may generate a visual cue by activating one or more illuminators to project light therefrom, generate an audible cue by causing one or more sounds (such as tones, sirens or spoken words such as "stay away!") to be emitted from one or more speakers, or take any other actions.

Accordingly, the systems and methods of the present disclosure include capacitive sensing systems having conductive components provided in selected locations on surfaces of systems, such as aerial vehicles, that are configured to detect the presence of one or more body parts of humans or other animals. Upon detecting a change in levels of capacitance of any of the conductive components, a system may determine whether the detected change exceeds one or more thresholds, or otherwise indicates that a body part of a human or another animal is within a proximity of the system, and execute one or more actions accordingly. For example, the system may halt or vary operations of one or more components of the system (e.g., motors or rotating propellers), cause the system to travel to another location, or otherwise avoid contact, or minimize a risk of contact, between components of the system and any humans or other animals.

In some implementations, aerial vehicles of the present disclosure may be programmed or configured to generate one or more environment maps of indoor spaces within a facility, based on images or other data captured by one or more sensors, e.g., the sensors 130-1, 130-2, 130-3. An environment map may identify or depict one or more boundaries (e.g., walls, ceilings, floors) or other aspects of indoor spaces, as well as the respective dimensions of such spaces, or the respective surfaces or textures of such boundaries. In some embodiments, an aerial vehicle may autonomously travel throughout an indoor space in order to capture data using one or more sensors, and such data may be utilized in generating an environment map of the indoor space. In some other embodiments, the aerial vehicle may be transported (e.g., carried) or escorted by a human actor throughout an indoor space, and may capture data using one or more sensors as the aerial vehicle is transported or escorted throughout the indoor space. Data captured as the aerial vehicle is escorted may be utilized in generating an environment map of the indoor space. Additionally, in some embodiments, the aerial vehicle may selectively operate one or more propulsion motors as the aerial vehicle is transported or otherwise escorted throughout an indoor space, in order to maintain altitude and/or tilt control. Furthermore, in some embodiments, data captured by the aerial vehicle as the aerial vehicle travels throughout the indoor space may be adjusted to account for presence of one or more body parts of a human actor that is transporting or otherwise escorting the aerial vehicle through the indoor space. Additionally, an environment map generated based on data captured using one or more sensors of an aerial vehicle may further include one or more layers identifying locations of utilities, services or other systems within an indoor space.

Aerial vehicles of the present disclosure may be configured to operate any access-related systems within an indoor space, including any portals or other systems, or to enable communication with persons within an indoor space via one or more secure communications channels (e.g., voice, video and/or data). In some embodiments, an aerial vehicle may be programmed or instructed to automatically open a door or other entry point in a home, an office or another structure (e.g., a private dwelling or business location), to access a public garage or other parking or standing area, or to activate an indication within an indoor space. For example, an aerial vehicle may be configured to transmit wireless codes, signals or other information to trigger a response from one or more devices or machines equipped with wireless transceivers, such as garage door openers, doorbells, lights, haptic feedback systems or other machines or devices. Aerial vehicles may also be configured to share any relevant information or data with persons, while preventing such persons from accessing any other sensitive information or data within the indoor space. Aerial vehicles may be further configured to communicate with any other vehicles or systems within an indoor space, including but not limited to cleaning robots, servicing robots, domestic robots, household robots, monitoring and/or surveillance robots, or robots of any other kind, e.g., to provide one or more instructions for performing one or more tasks within the indoor space.

In accordance with some embodiments of the present disclosure, an aerial vehicle may be configured to operate along with one or more docking stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a fuselage of the aerial vehicle, and to enable the aerial vehicle to be aligned in one of a plurality of alignments or orientations with respect to the base component, the charging dock or intermediary device.

For example, in some embodiments, an aerial vehicle may also include one or more contacts that are positioned or aligned in an arrangement or pattern on an external surface of a portion of the aerial vehicle, e.g., a fuselage of the aerial vehicle, that is designed to contact corresponding portions of a base component, a charging dock or another intermediary device. One or more internal surfaces of the base component, the charging dock or the intermediary device may include contacts that are positioned or aligned in an arrangement or pattern that is consistent with arrangements or patterns of contacts on external surfaces of an aerial vehicle, such that the contacts on the external surface of the portion of the aerial vehicle and the contacts on the one or more internal surfaces of the base component, the charging dock or the intermediary device mate or otherwise come into contact with one another when the portion of the aerial vehicle is in one of a plurality of predetermined alignments or orientations.

In some embodiments, an aerial vehicle may include one or more cameras or other optical sensors having fields of view that extend below the aerial vehicle and are aligned to capture imaging data while the aerial vehicle executes one or more landing evolutions. Thus, when the portion of the aerial vehicle attempts to land on a docking station or at another location, such cameras or other optical sensors may be used to guide the aerial vehicle onto the docking station or another landing surface.

Moreover, aerial vehicles of the present disclosure may be configured for use or operation within indoor spaces or facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks).

In some implementations, the aerial vehicles of the present disclosure may be dispatched or otherwise instructed to travel to one or more locations, to capture images or other data in such locations, and to determine whether a predetermined event or condition (e.g., an alarm event or condition) is occurring or has occurred at the one or more locations. In some embodiments, the aerial vehicles may be dispatched or instructed to travel to such locations directly, e.g., in response to one or more sets of instructions received from an external computer device over one or more networks.

The aerial vehicles of the present disclosure may take any action in response to determining that one or more sensors has detected a predetermined event or condition, or upon processing or otherwise analyzing data captured from one or more spaces within a facility. For example, an aerial vehicle may affirmatively determine, e.g., to various levels of confidence, that a predetermined event or condition has occurred in one or more spaces within a facility or, alternatively, that the predetermined event or condition has not occurred in such spaces. Alternatively, the aerial vehicles of the present disclosure may transmit images or other data captured from such spaces to one or more external computer devices or systems, such as a base component or other station configured to charge the aerial vehicles with electrical power (e.g., a base component, a charging dock, or another intermediary device or system) within the facility or, alternatively, to a server or other computer device or system provided in one or more alternate or virtual locations, e.g., in a "cloud"-based environment. The images or other data may be transmitted independently or along with one or more measures of a level of confidence (e.g., a confidence score) as to whether a predetermined event or condition has occurred or is present within the one or more spaces. Subsequently, the external computer device or system may make a determination, based on the images or other data, or any other data captured by one or more sensors present within such spaces or in any other location, whether a predetermined event or condition has occurred or is present within such spaces, or whether the predetermined event or condition has not occurred or is not present in such spaces.

Moreover, upon determining that a predetermined event or condition has occurred or is present within one or more spaces of a facility, an aerial vehicle of the present disclosure, or a base component, a charging dock or another intermediary device in communication with the aerial vehicle, may transmit one or more requests or sets of instructions requesting additional resources at such spaces to one or more external computer devices or systems.

Figure 2:
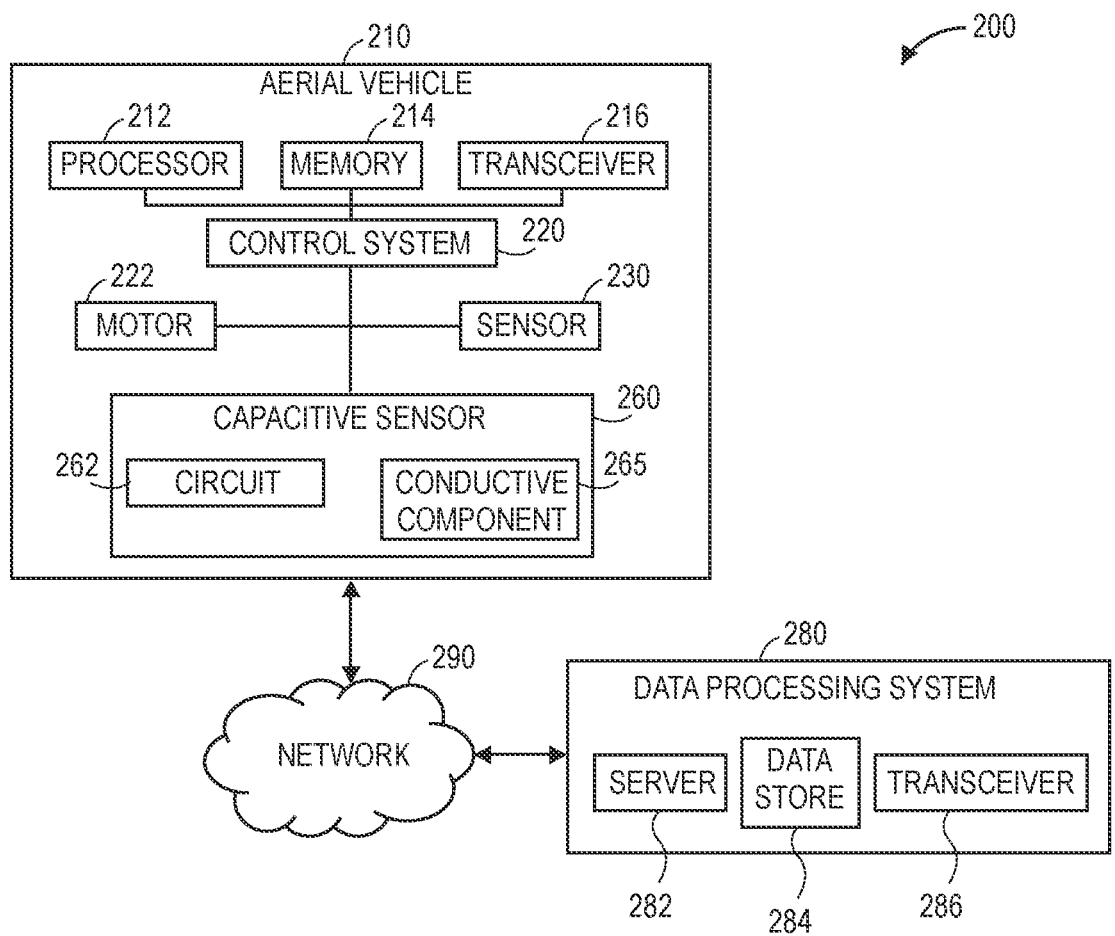
FIG. 2 is a block diagram of one system including an aerial vehicle in accordance with embodiments of the present disclosure.

Referring to FIG. 2, a block diagram of components of one system including an aerial vehicle in accordance with embodiments of the present disclosure is shown. The system 200 includes an aerial vehicle 210 and a data processing system 280 that are connected to one another across a network 290, which may include the Internet in whole or in part. Except where otherwise noted, reference numerals preceded by the number "2" shown in FIG. 2 refer to elements that are similar to elements having reference numerals preceded by the number "1" shown in FIGS. 1A through 1G.

The aerial vehicle 210 may be any type or form of aerial vehicle (e.g., an unmanned aerial vehicle, or drone) that may be programmed or configured to autonomously perform one or more operations within indoor spaces of a facility. As is shown in FIG. 2, the aerial vehicle 210 includes a processor 212, a memory 214 and a transceiver 216. The aerial vehicle 210 further includes a control system 220, one or more motors 222, and one or more sensors 230, as well as one or more capacitive sensors 260 (or capacitive sensing systems).

The processor 212 may be configured to perform any type or form of computing function associated with the operation of the aerial vehicle 210. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the aerial vehicle 210. The processor 212 may be configured to control any aspects of the operation of the aerial vehicle 210 and any computer-based components thereon, including but not limited to the motors 222 or the sensors 230. For example, the processor 212 may control the operation of one or more control systems or modules, such as the control system 220, for generating instructions for conducting operations of one or more of the motors 222 or the sensors 230. Such control systems or modules may be associated with one or more other computing devices or machines, and may communicate with the data processing system 280 or one or more other computer devices over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, paths or routes, control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), non-volatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols or standards such as Bluetooth or any Wi-Fi protocol, over the network 290 or directly. The transceiver 216 may further include or be in communication with one or more input/output (or "I/O") interfaces, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, or the motors 222 or sensors 230. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the motors 222, e.g., to cause one or more of the motors 222 to operate at desired speeds, in order to guide the aerial vehicle 210 along a desired course, at a desired speed, or at a desired altitude, as appropriate. The control system 220 may further control any other aspects of the aerial vehicle 210, including but not limited to the operation of one or more steering or braking systems of a ground vehicle, or one or more control surfaces such as wings, rudders, flaperons, elevons, elevators, ailerons, flaps, brakes or slats of an aerial vehicle, within desired ranges. In some embodiments, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide thrust and/or lift forces to the aerial vehicle 210 and any payload engaged thereby. In some embodiments, one or more of the motors 222 may be a brushless direct current ("DC") multi-phase motor such as an outrunner brushless motor or an inrunner brushless motor.

The aerial vehicle 210 may include any number of such motors 222 of any kind. For example, one or more of the motors 222 may be aligned or configured to operate with different capacities or ratings, or at different speeds, or coupled to any number of propellers having different sizes and shapes. Additionally, one or more of the motors 222 may be an electric motor, e.g., a brushless DC multi-phase motor, and one or more of the motors 222 may be a gasoline-powered motor.

The aerial vehicle 210 may also include any number of sensors 230 or other components or other features for capturing data within a vicinity of the aerial vehicle 210, including but not limited to one or more imaging devices (e.g., digital cameras), range sensors (e.g., LIDAR sensors, time-of-flight sensors, ultrasonic sensors, or others), Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors (e.g., microphones, piezoelectric sensors, vibration sensors or other transducers for detecting and recording acoustic energy from one or more directions). For example, in some implementations, the aerial vehicle 210 may include two or more of such sensors 230 in an IMU or any other system.

As is also shown in FIG. 2, the aerial vehicle 210 may further include any number of capacitive sensors 260. The capacitive sensors 260 may include any number of circuits 262 and any number of conductive components 265 (e.g., electrodes), which may be conductive components of any size, shape or dimensions. In some implementations, the circuits 262 may include one or more transistors, e.g., small-outline transistors, such as one or more SOT-26 transistors, that are configured to determine levels of capacitance on the conductive components 265, as well as to detect changes in such levels, or calculate amounts of such changes. The circuits 262 may further include any number of reference capacitors or resistors for varying a level of sensitivity of the respective circuits 262 or the capacitive sensors 260 as a whole. The circuits 262 may also be coupled to one or more voltage sources, e.g., direct current (or "DC") voltage sources.

The conductive components 265 may have any size, shape or dimensions (e.g., lengths, widths or thicknesses), and may be formed from any suitable materials, including but not limited to copper, aluminum or any other conductive or semi-conductive materials. The sizes, shapes and dimensions of the conductive components 265, or the materials from which the conductive components 265 are formed, may be selected on any basis, e.g., to increase or decrease sensitivity of the capacitive sensors 260, which may be defined or determined based on the size, the shape, the dimension or the dielectric properties of the portions of the aerial vehicle 210 to which the conductive components 265 are joined, or any other factors.

Although the block diagram of FIG. 2 includes a single box corresponding to a motor 222, a single box corresponding to a sensor 230, a single box corresponding to a capacitive sensor 260, and single boxes corresponding to a circuit 262 and a conductive component 265, those of ordinary skill in the pertinent arts will recognize that the aerial vehicle 210 may include any number of motors 222, sensors 230, capacitive sensors 260, circuits 262 and conductive components 265 in accordance with the present disclosure.

Furthermore, in some implementations, the motors 222, sensors 230, the capacitive sensors 260 and other components may be provided in association with systems other than aerial vehicles. For example, the motors 222, sensors 230, the capacitive sensors 260 and other components described herein may be utilized in connection with any systems having motor-driven or powered components that rotate or otherwise move.

The data processing system 280 includes one or more physical computer servers 282 having one or more computer processors, one or more data stores (e.g., databases) 284, and any number of transceivers 286 associated therewith, as well as provided for any specific or general purpose. In some embodiments, the data processing system 280 of FIG. 2 may be independently provided for the exclusive purpose of receiving, analyzing or storing information or data received from the aerial vehicle 210 or, alternatively, provided in connection with one or more physical or virtual services configured to receive, analyze or store such information or data, as well as one or more other functions. In some other embodiments, the data processing system 280 may be associated with an electronic marketplace, a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations, which may further include any number of associated servers, data stores, processors or like computer components. Alternatively, or additionally, in some embodiments, the data processing system 280 may be associated with any number of public or private authorities, such as police, fire or security personnel.

The servers 282 may be connected to or otherwise communicate with the data stores 284 and the transceivers 286, and may receive, analyze or store any type of information or data, e.g., imaging data, acoustic signals, environmental conditions, operational characteristics, or positions, or any other information or data, for any purpose. The servers 282 and/or the data stores 284 may also connect to or otherwise communicate with the network 290, through the sending and receiving of digital data. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more vehicles, including but not limited to the aerial vehicle 210.

Each of the transceivers 216, 286 or other communications devices, systems or components may be configured to communicate through one or more wired or wireless means, e.g., wired technologies such as Universal Serial Bus (or "USB") or fiber optic cable, or wireless standards or protocols such as Bluetooth or any Wi-Fi protocol, over the network 290 or directly. The transceivers 216, 286 may further include or be in communication with one or more I/O interfaces, network interfaces or devices, and may be configured to allow information or data to be exchanged between one another, or to or from one or more other computer devices or systems via the network 290.

The transceivers 216, 286 may perform any necessary protocol, timing or other data transformations in order to convert data signals from a first format suitable for use by one component into a second format suitable for use by another component. For example, in some embodiments, the transceivers 216, 286 may be configured to communicate according to one or more protocols traditionally associated with discrete components, e.g., within specific frequency spectra, including but not limited to radio frequency signals typically within ranges of approximately three hundred to four hundred megahertz, or MHz, as well as radio frequency signals typically within ranges of approximately three hundred to five hundred megahertz, or MHz.

In some embodiments, the transceivers 216, 286 may be configured to transmit or receive Bluetooth signals sent within an industrial, scientific and medical (ISM) radio frequency range of approximately 2.400 to approximately 2.500 gigahertz (GHz), with a center frequency of approximately 2.450 GHz. Such signals are typically sent within a particular range of approximately 2.402 to approximately 2.480 GHz, and have a maximum transmission rate on Bluetooth networks of 3 megabits per second (or 3 Mbps) or more, with a maximum transmission range of 10 to 100 meters or more, and at powers of approximately one milliwatt (mW), or 0.001 watts (W). The transceivers 216, 286 may operate according to a frequency-hopping spread spectrum (FHSS) method, e.g., by switching carriers across multiple frequency channels and transmitting communications in small segments, and in respective time slots. In some embodiments, such communications may be transmitted at approximately 1,600 times per second across 79 different subfrequencies at bandwidths of 0.001 GHz, or one megahertz (MHz) across the 2.402 to 2.480 GHz range.

In some embodiments, the transceivers 216, 286 may be configured to transmit or receive Ultra-Wide Band (or "UWB") signals over one or more broad spectrums within any radio frequency range. In some embodiments, the UWB signals may be transmitted and/or received over a range of approximately three to eleven gigahertz (GHz), or over a range of approximately four to six gigahertz (GHz), with a center frequency of approximately five gigahertz (GHz). Alternatively, the UWB signals may be transmitted over any frequency range, and with any center frequency. Additionally, the UWB signals may consist of billions of pluses transmitted across such frequency spectrums, and at various power levels or power densities.

In some embodiments, the transceivers 216, 286 may be configured to transmit or receive RFID signals at low frequency (LF), medium frequency (MF) or high frequency (HF) levels (e.g., approximately 3 kilohertz to 30 megahertz, or 3 kHz-30 MHz) and transfer relatively small-sized sets or packets of data over short ranges (e.g., between one and one hundred centimeters, or 1-100 cm). In some other embodiments, the transceivers 216, 286 may be configured to transmit or receive RFID signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Alternatively, the transceivers 216, 286 may be configured to communicate within customized frequency spectra, or at dynamic frequencies, in accordance with the present disclosure. For example, in some embodiments, one or more of the transceivers 216, 286 may be configured to communicate according to a proprietary standard or protocol, or within a proprietary frequency spectrum.

In some embodiments, the transceivers 216, 286 may include support for devices attached through various types of peripheral buses, e.g., variants of the Peripheral Component Interconnect (PCI) bus standard or the Universal Serial Bus (USB) standard. In some other embodiments, functions of the transceivers 216, 286 may be split into two or more separate components, or incorporated directly into one or more processors or other components.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein. Any combination of networks or communications protocols may be utilized in accordance with the systems and methods of the present disclosure. For example, the various components described herein may be configured to communicate via an open or standard protocol such as Wi-Fi. Alternatively, such components may be configured to communicate with one another directly outside of a centralized network, such as the network 290, e.g., by a wireless protocol such as Bluetooth, in which two or more of such components may be paired with one another.

The computers, servers, devices and the like described herein have the necessary electronics, software, memory, storage, databases, firmware, logic/state machines, microprocessors, communication links, displays or other visual or audio user interfaces, printing devices, and any other I/O devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the aerial vehicle 210 and/or the data processing system 280 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the aerial vehicle 210 and/or the data processing system 280 may operate any of a number of computing devices that are capable of communicating over the network, including but not limited to set-top boxes, personal digital assistants, digital media players, web pads, laptop computers, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 212 and/or the data processing system 280, or any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
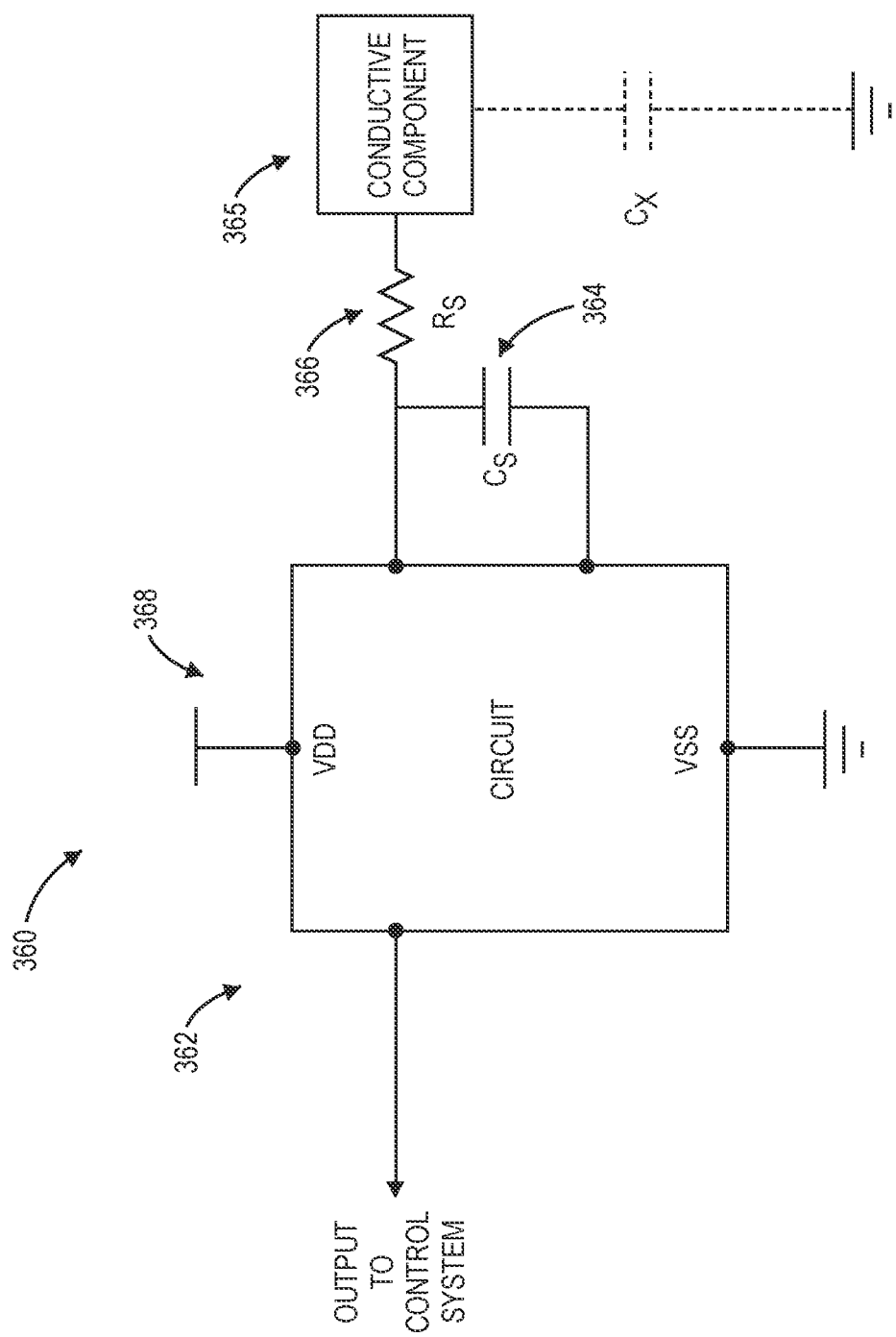
FIG. 3 is a view of aspects of one system in accordance with embodiments of the present disclosure.

As is discussed above, systems and methods of the present disclosure may include capacitive sensing systems having circuits including one or more components for detecting levels of capacitance on conductive components provided on surfaces of aerial vehicles or other systems. Referring to FIG. 3, a view of aspects of one system in accordance with embodiments of the present disclosure is shown. Except where otherwise noted, reference numerals preceded by the number "3" shown in FIG. 3 refer to elements that are similar to elements having reference numerals preceded by the number "2" shown in FIG. 2, by the number "1" shown in FIGS. 1A through 1G.

As is shown in FIG. 3, a capacitive sensor 360 includes an integrated circuit component 362 coupled to a conductive component 365, which may include any electrode or another conductive component provided on one or more surfaces of an aerial vehicle or another system having one or more rotating or otherwise moving components.

The conductive component 365 may be coupled to the integrated circuit component 362 in a manner that enables the capacitive sensor 360 to determine a level or change in a level of capacitance $C_x$ on the conductive component 365. The integrated circuit component 362 may thus generate and transmit one or more signals representative of the level of capacitance $C_x$, or of any changes in the level of capacitance $C_x$, to a control system for operating one or more motors or other systems for causing movements of one or more objects. The conductive component 365 may be formed from any suitable materials, e.g., copper, aluminum or any other conductive or semi-conductive materials, and applied to surfaces of systems in any manner, such as by one or more fasteners, such as clips, screws, bolts, snap-fit connectors, or any other like features, or one or more adhesives, such as glues, tapes or other materials. Alternatively, the conductive component 365 may be a portion of such systems. For example, in some implementations, the conductive component 365 may be an integral portion of a ring, a spoke, or any other portion of a mesh section provided in association with a housing of an aerial vehicle or another system.

The integrated circuit component 362 may have one or more leads connected to a capacitor (e.g., a charge-sensing sample capacitor) 364, a series resistor 366 and a voltage source 368. Alternatively, or additionally, the capacitive sensor 360 may include any components other than the integrated circuit component 362 for determining a level or change of capacitance $C_x$ on the conductive component 365. Moreover, in some implementations, the integrated circuit component 362 (or any other component) may receive inputs from any number of conductive components 365, and may be configured to determine or generate signals representative of levels or change of capacitance on any of such components. Alternatively, in some implementations, an aerial vehicle or another system may include any number of integrated circuit components 362 (or other components), each configured to receive inputs from one or more conductive components 365, and generate signals representative of levels or change of capacitance on any of such components.

In accordance with one or more implementations, the integrated circuit component 362 may include any number of transistors, e.g., small-outline transistors, or transistors of any other type or form.

The capacitor 364 may have any value or level of capacitance $C_S$, e.g., on an order of one to fifty nanofarads (1 to 50 nF), or one to one hundred nanofarads (1 to 100 nF), that may be selected to configure or enhance a level of sensitivity of the capacitive sensor 360 or to vary a level of response time of the capacitive sensor 360. For example, the capacitor 364 may have a value or level of capacitance $C_S$ selected based on attributes of surfaces of a system with which the conductive component 365 is associated, such as thicknesses or dielectric properties of such surfaces. Where a value or level of capacitance $C_S$ of the capacitor 364 is substantially high, greater stability and higher dielectric properties of such surfaces are required in order to enhance the sensitivity and reliability of signals generated by the integrated circuit component 362. Preferably, a value or level of capacitance $C_S$ is selected to be approximately one thousand times greater than an anticipated range in the value or level of capacitance $C_x$.

The capacitor 364 may be of any type, and may take any shape or form. In some implementations, the capacitor 364 may be a stable-type capacitor, such as an X7R capacitor, a polyphenylene sulfide film capacitor, or any other type or form of capacitor.

The series resistor 366 may be provided in line with a connection between the conductive component 365 and the integrated circuit component 362, in order to limit any electrostatic discharge or suppress any interference, e.g., radio frequency interference. The series resistor 366 may have any value or level of resistance $R_S$, e.g., approximately one to forty kiloohms (1 to 40 kΩ). Alternatively, in some implementations, the series resistor 366 may be omitted from the capacitive sensor 360.

The voltage source 368 may be any source of direct current electrical power for the capacitive sensor 360. For example, the voltage source 368 may be an independent power supply for the capacitive sensor 360, or a connection to a power supply that is shared by the capacitive sensor 360 and any other components of a system, such as an aerial vehicle. In some implementations, the voltage source 368 may include any number of regulators, switches, diodes or other systems for supplying, controlling or isolating power to the capacitive sensor 360.

In addition to the integrated circuit component 362, the capacitor 364, the resistor 366 and the voltage source 368, the capacitive sensor 360 may include any number of other components (not shown in FIG. 3). For example, in some implementations, the capacitive sensor 360 may include a bypass capacitor provided between a voltage drain (or "VDD") and a voltage source (or "VSS") e.g., to prevent latching following any transients. In some implementations, the capacitive sensor 360 may further include one or more substantially large resistors, e.g., on an order of one megaohm, between the capacitor 364 and ground. In some implementations, the capacitive sensor 360 may also include one or more output state resistors.

Figure 4:
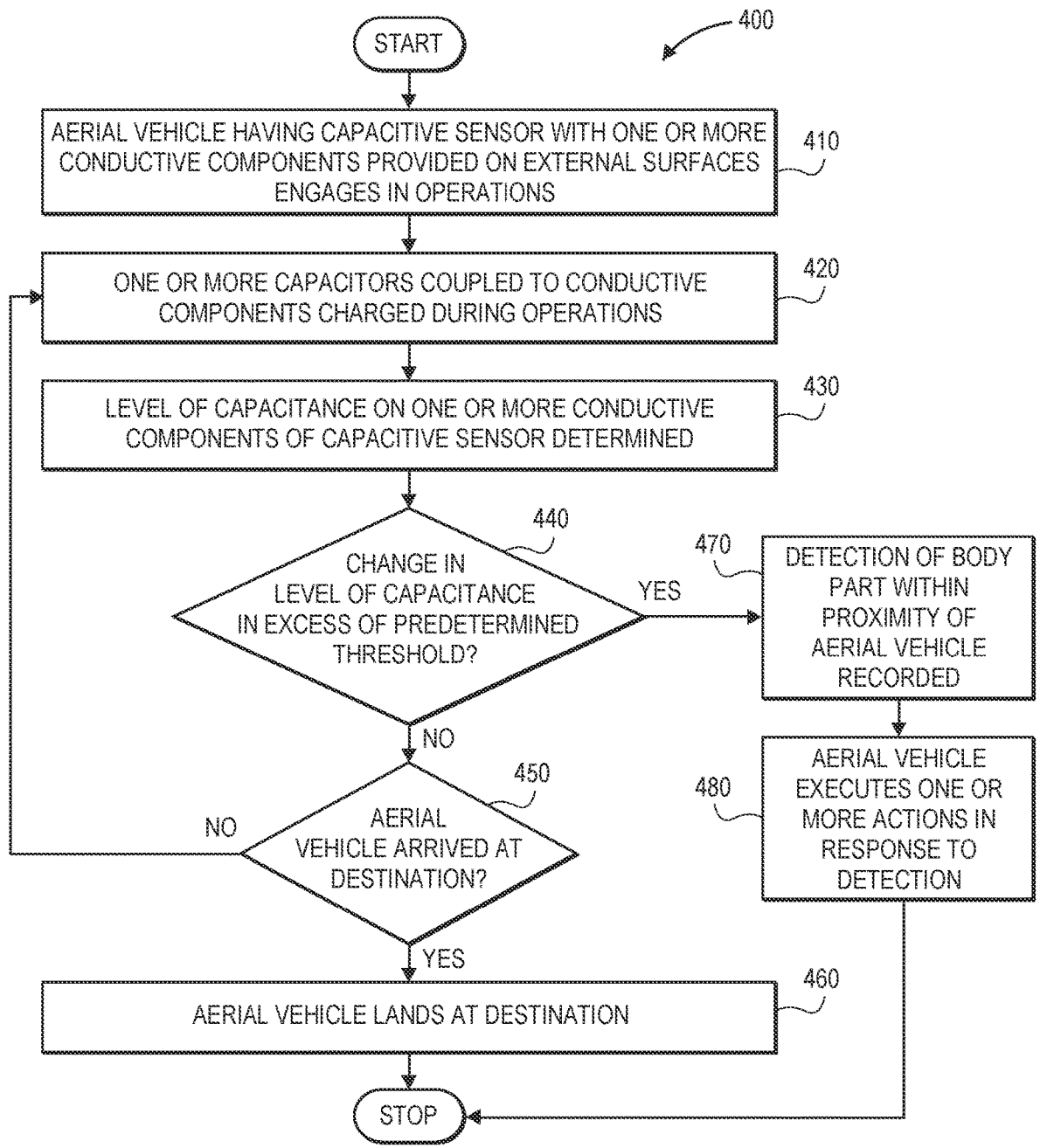
FIG. 4 is a flow chart of one process in accordance with embodiments of the present disclosure.

Referring to FIG. 4, a flow chart 400 of one process in accordance with embodiments of the present disclosure is shown. At box 410, an aerial vehicle having a capacitive sensor with one or more conductive components (e.g., surface electrodes) provided on external surfaces engages in operations. For example, the aerial vehicle may be programmed with a transit plan or other information or data regarding a mission to be undertaken by the aerial vehicle, including but not limited to positions corresponding to an origin for the mission and a destination for the mission, as well as positions of any waypoints along a route between the origin and the destination. The transit plan may further include estimated times of arrival or departure from such points, courses of paths between such waypoints, speeds or altitudes at which the aerial vehicle should travel on such courses, as well as any actions to be performed by the aerial vehicle along the route in accordance with the transit plan.

A control system or another component of the aerial vehicle may be programmed with one or more sets of instructions for generating trajectories to cause the aerial vehicle to travel on such courses, speeds or altitudes along the route, or to perform such actions. For example, the aerial vehicle may be configured to calculate trajectories for traveling along a route or path defined by waypoints, which may be represented in global or local coordinates, e.g., Cartesian coordinates, such as in a manner that minimizes snap. An aerial vehicle may calculate a trajectory at any time prior to, during or following operations, such as when the aerial vehicle is at or over a waypoint, when the aerial vehicle has potentially detected an obstacle, or when the aerial vehicle has determined that a braking maneuver is necessary, among others. A trajectory calculated in this manner may include sets of points in three-dimensional space, e.g., a set of points in a three-dimensional coordinate system.

In some implementations, a trajectory may also include, for each defined point in three-dimensional space forming part of the trajectory, a time value indicating a time at which the trajectory passes through that point, or a time at which an aerial vehicle following that trajectory should pass through that point. Thus, a trajectory may be characterized as defining points in four dimensions, viz., in three-dimensional space and time. In some implementations, a trajectory may also include, for each defined point in three-dimensional space forming part of the trajectory, a yaw value indicating a yaw angle of an aerial vehicle at that point of the trajectory. In some implementations, a trajectory is calculated using, or is defined by, one or more equations, e.g., a set of polynomial equations, and positions of points along the trajectory may be calculated using the one or more trajectory equations. In some implementations, one or more trajectory equations may be used to generate x(t), y(t), and z(t) values indicating a position of the aerial vehicle in three-dimensional space at each time t along a trajectory. In some implementations, the trajectory equations, or the x(t), y(t), and z(t) values generated based thereon, may also be used to generate velocity information for the aerial vehicle in three-dimensional space at each time t along the trajectory, including both a speed and a direction of the aerial vehicle at each time t.

In some implementations, one or more trajectory equations may be used to generate a yaw value $\psi(t)$ indicating a yaw angle of the aerial vehicle at the time t along a trajectory. In some implementations, trajectory equations or yaw values generated based thereon may be used to generate yaw angular velocity information for the aerial vehicle at each time t along the trajectory, including both a rotational speed and a rotational direction of the aerial vehicle at each time t.

The capacitive sensor may include any number of capacitors, as well as any number of components for detecting levels of capacitance, or changes in such levels, of one or more capacitors of a capacitive sensor. For example, in some implementations, the aerial vehicle may include a safety mesh or grill covering portions of propeller, motors or other components that may rotate or otherwise move during operations of the aerial vehicle. Alternatively, the safety mesh or grill may cover components that reach extreme temperatures (e.g., very hot or very cold surfaces), sharp components, or components that should not be contacted by humans or other animals during such operations.

The capacitive sensor may, therefore, include one or more components for sensing the proximity of portions of such humans or other animals to components of the aerial vehicle during operations. In some implementations, the capacitive sensor may include an electrode provided in association with a portion of the mesh or grill, which may be conductive or partially conductive in nature, and formed from one or more conductive or semi-conductive materials such as aluminum, carbon fiber, copper, graphite, or others. In some implementations, the capacitive sensor may further include one or more regulators or integrated circuits or integrated circuit components. For example, in some implementations, the capacitive sensor may include a conductive portion of a mesh, a grill or another protective feature, as well as an integrated circuit component coupled to a regulator, and a ground plane arranged beneath the regulator and a ground pin of the integrated circuit component.

The capacitive sensor may also include one or more components or features having any number of attributes that may be selected to maintain a level of sensitivity of the capacitive sensor. For example, the capacitive sensor may include one or more reference capacitors and/or resistors having values of capacitance or resistance that are selected to maintain a level of gain of the capacitive sensor or a response time of the capacitive sensor. Alternatively, the values of capacitance or resistance may be selected based on dielectric constants of materials of the aerial vehicle to which the electrodes are affixed. Alternatively, the capacitances or resistances on the reference capacitors and resistors may be selected on any other basis.

Alternatively, the aerial vehicle may include any number of capacitive sensors, and need not be limited to a single capacitive sensor.

Furthermore, as yet another alternative, the capacitive sensors may be provided on a system other than an aerial vehicle within a vicinity of one or more objects or components that rotate or otherwise move during operations. For example, the capacitive sensors may be mounted to a blender, a food processor, a lawn mower or trimmer, or any other such system.

At box 420, one or more capacitors of the capacitive sensor coupled to the conductive components are charged during the operations of the aerial vehicle. For example, where the capacitive sensor includes a voltage supply (e.g., a DC voltage supply), voltage may be applied to the one or more capacitors while the aerial vehicle is in flight or, alternatively, prior to taking off from an origin, such as during pre-flight preparations. The capacitive sensor may include any number of switches or other controllers that may be operated to apply voltage to the one or more capacitors, or to isolate voltage from the one or more capacitors.

At box 430, a level of capacitance on the conductive components of the capacitive sensor is determined. The level of capacitance may be determined in any manner. For example, in some implementations, the capacitors may be constantly discharged and charged during the operations of the aerial vehicle, and a time required to discharge the capacitors may be determined. A level of capacitance on the conductive components may be determined as a function of a discharge time or a charge time.

At box 440, whether a change in the level of capacitance in excess of a predetermined threshold has been detected is determined. For example, the level of capacitance on the one or more conductive components may be determined continuously, or at any predetermined interval of time. Where an overall change in the levels of capacitance exceeds a predetermined threshold, or whether a rate of change in the levels of capacitance exceeds the predetermined threshold, may be determined based on consecutive levels of capacitance determined at box 430, or levels of capacitance determined at various times. For example, where times required to discharge or charge the capacitors during operations are determined, a change in a level of capacitance may be detected where a change in either a time required to discharge the capacitors or a time required to charge the capacitors is observed, and the change may be compared to one or more thresholds of time or capacitance that are selected in any manner and on any basis. For example, a predetermined threshold may be selected based on a level of sensitivity of the capacitive sensor, a desired response time for the capacitive sensor, dimensions of one or more indoor spaces in which the aerial vehicle is operating, or any other factors.

If a change in the level of capacitance exceeding the predetermined threshold has not been detected at box 440, then the process advances to box 450, where whether the aerial vehicle has arrived at a destination is determined. For example, where the aerial vehicle is configured with one or more sensors for determining positions within indoor spaces, e.g., position sensors, cameras, odometers or others, the aerial vehicle may capture data using such sensors and compare a position determined based on such data to a position associated with the destination to determine whether the aerial vehicle is sufficiently proximate the destination in order to engage in one or more landing operations, or has slowed, hovered, braked or landed at the destination.

If the aerial vehicle has not arrived at the destination, then the process returns to box 420, where one or more capacitors of the capacitive sensor are charged during the continued operations of the aerial vehicle. If the aerial vehicle has arrived at the destination, however, then the process advances to box 460, where the aerial vehicle lands at the destination, and the process ends.

If a change in the level of capacitance in excess of the predetermined threshold has been detected at box 440, however, then the process advances to box 470, where a detection of a body part within a proximity of the aerial vehicle is recorded. For example, where the change in the level of capacitance of the one or more capacitors is determined to have exceeded a predetermined threshold, the change may be presumed to be associated with a presence of a body part of a human or another animal within a vicinity of one of the electrodes.

Upon detecting the body part, information or data regarding the operations of the aerial vehicle may be determined and stored in one or more data stores. For example, in some implementations, a position of the aerial vehicle at a time of the detection, as well as a course, a speed and an altitude on which the aerial vehicle was traveling at the time, may be determined and recorded. Alternatively, or additionally, any additional information or data, such as images or other data captured at or near the time of the detection may be stored in association with the position, the course, the speed or the altitude. Such information or data may also identify one or more operations being performed by the aerial vehicle at the time of the detection.

At box 480, the aerial vehicle executes one or more actions in response to the detection of the body part, and the process ends. For example, the aerial vehicle may be programmed or configured to, upon detecting a body part within a vicinity based on a change in a level of capacitance, execute one or more actions in response to the detection. Such actions may include, but need not be limited to, causing the aerial vehicle to travel from a position at which the change was detected to a position that is located at a safe distance, range or altitude above, away or from the body part. For example, the aerial vehicle may be preprogrammed with one or more sets of instructions that, when executed, cause the aerial vehicle to operate one or more of motors to generate lift and thrust to cause the aerial vehicle to change its position by predetermined amounts (or distances) along one or more principal axes. Values of the amounts (or distances) may be selected on any basis, such as values of the changes or one or more safety factors, as well as any dimensions or features of the indoor spaces. Alternatively, in some implementations, the aerial vehicle may execute one or more sets of instructions to cause one or more of the motors to immediately stop, thereby causing the aerial vehicle to descend in altitude, away from the position at which the change was detected. While falling, the aerial vehicle may sense the change in altitude and execute one or more sets of instructions to cause the motors to reengage in operation once the aerial vehicle is sufficiently far from the position at which the change was detected, and to land or otherwise take any other action. As yet another alternative, an aerial vehicle may generate one or more visual or audible cues, such as by activating any number of illuminators to project light in any number of colors therefrom, or by causing one or more sounds (e.g., tones, sirens or spoken words such as "stay away!") to be emitted from one or more speakers, or any other actions.

Thresholds for initiating changes in operations of systems upon detecting changes in levels of capacitance may be selected on any basis. Referring to FIGS. 5A through 5D, views of aspects of operations of one aerial vehicle in accordance with implementations of the present disclosure are shown. Except where otherwise noted, reference numerals preceded by the number "5" shown in FIGS. 5A through 5D refer to elements that are similar to elements having reference numerals preceded by the number "3" shown in FIG. 3, by the number "2" shown in FIG. 2, by the number "1" shown in FIGS. 1A through 1G.

Figure 5A:
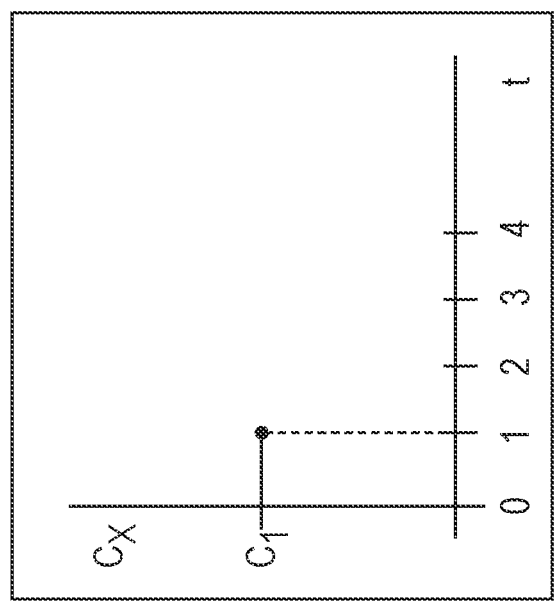
FIGS. 5A through 5D are views of aspects of operations of one aerial vehicle in accordance with implementations of the present disclosure.
Figure 5A:
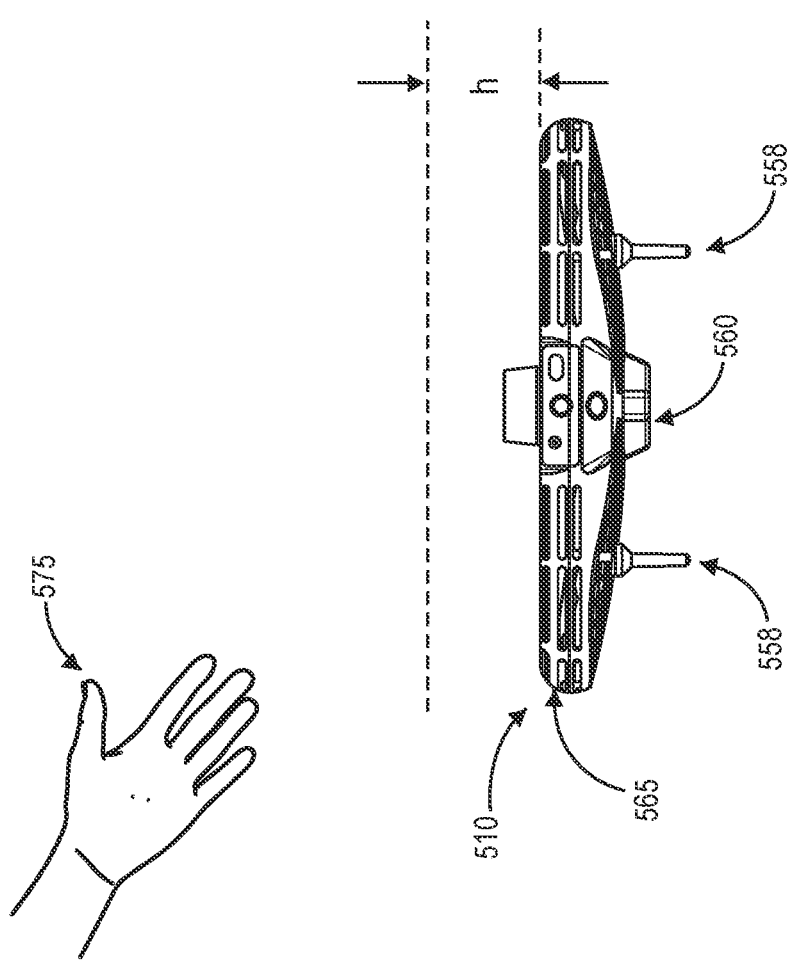

As is shown in FIG. 5A, an aerial vehicle 510 is engaged in operations, e.g., hovering at an altitude, or traveling on a course, at a speed and at an altitude, within an indoor space or in any other location. The aerial vehicle 510 is outfitted with a plurality of landing pegs 558, e.g., extensions or appurtenances extending below the aerial vehicle 510, to complete a landing evolution on any substantially flat surface. The aerial vehicle 510 is further outfitted with a capacitive sensing system 560 having a plurality of conductive components 565 (e.g., electrodes) provided on an outer surface of the aerial vehicle 510. The conductive components 565 may be provided on external surfaces of the aerial vehicle 510 and coupled to any number of capacitors, circuits, voltage sources or other components within a housing or chamber of the aerial vehicle 510. For example, in some implementations, such as is shown in FIGS. 1A and 1B, the conductive components 565 may be conductive components mounted or affixed to portions of a lattice structure provided above, below or around one or more motors and rotating propellers of the aerial vehicle 510. The conductive components 565 may be formed from any suitable materials, e.g., copper, aluminum or any other conductive or semi-conductive materials, and may have any sizes, shapes or dimensions.

The conductive components 565 and any capacitors, resistors or other components of the capacitive sensing system 560 may be selected on any basis in order to achieve a level of sensitivity that enables the aerial vehicle 510 to respond to a detection of the presence of one or more body parts of humans or other animals, e.g., a hand 575 of a grounded human body, as necessary. For example, sizes, shapes or dimensions of the conductive components 565, as well as materials from which the conductive components 565 are formed or locations on the aerial vehicle 510 on which the conductive components 565 are mounted or affixed, may be selected to ensure that the capacitive sensing system 560 detects the presence of one or more body parts at a predetermined distance h from the aerial vehicle 510 in general, or from one or more of the conductive components 565 in particular. Alternatively, or additionally, capacitors, resistors, transistors or other components of the capacitive sensing system 560 may be selected to establish a level of gain or sensitivity of the capacitive sensing system 560, or on any other basis.

As is further shown in FIG. 5A, the capacitive sensing system 560 may determine a level of capacitance $C_1$ for a capacitor system including one or more of the conductive components 565 at a time t. The level of capacitance $C_1$ may be maintained in one or more memory components or stored in one or more data stores provided on the aerial vehicle 510. Alternatively, the level of capacitance $C_1$ may be transmitted to one or more external devices or systems.

Figure 5B:
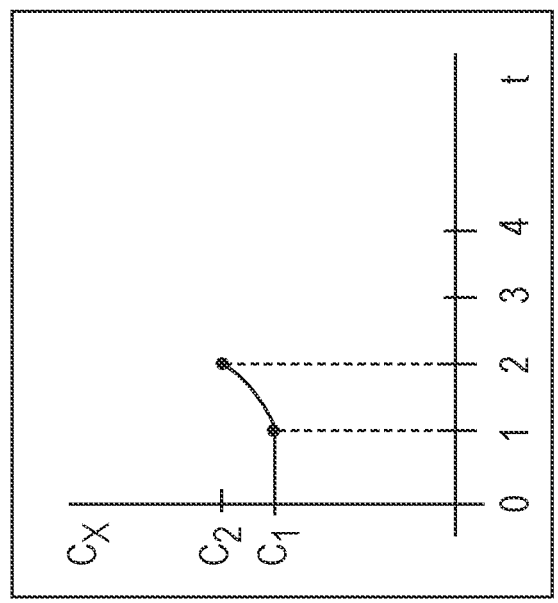
Figure 5B:
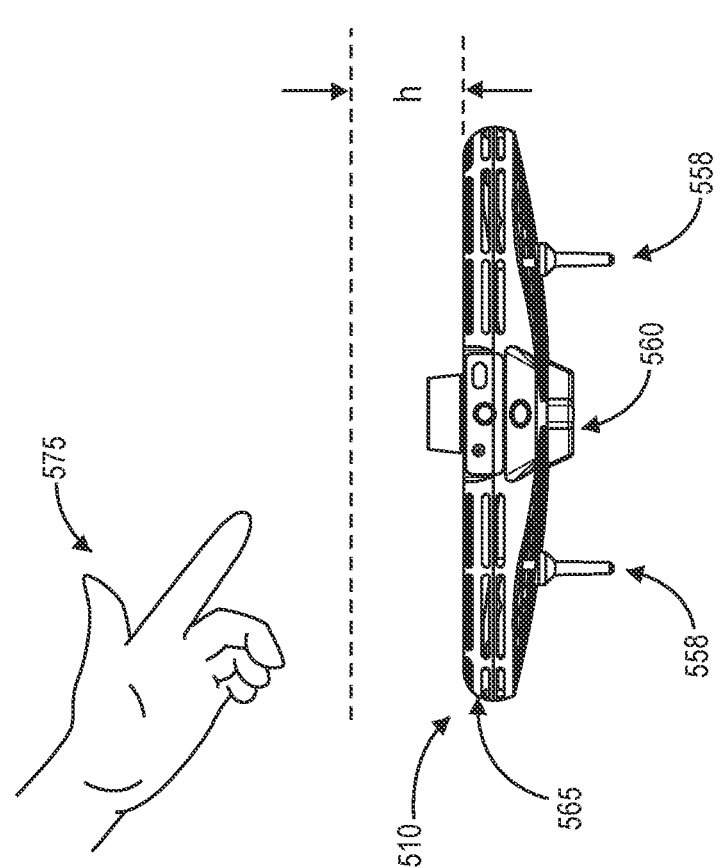

As is shown in FIG. 5B, as the hand 575 approaches the aerial vehicle 510, the capacitive sensing system 560 determines a level of capacitance $C_2$ for the capacitor system including one or more of the conductive components 565 at a time $t_2$, which follows the time $t_1$. The level of capacitance $C_2$ is greater than the level of capacitance $C_1$, due to the proximity of the hand 575, and the resulting changes in the behavior of the capacitive sensing system 560. In particular, a change in a relative distance between the hand 575 and the conductive components 565 may impact an electromagnetic field, or a photon field, proximate the conductive components 565, thereby also impacting an amount of charge that may be stored by the capacitor system at a given voltage.

Figure 5C:
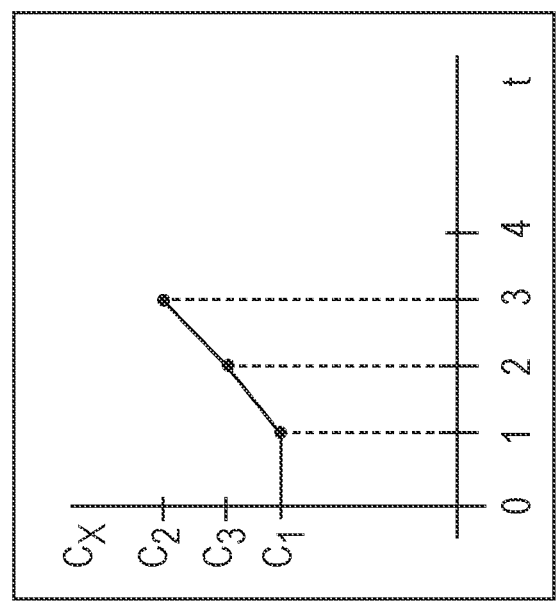
Figure 5C:
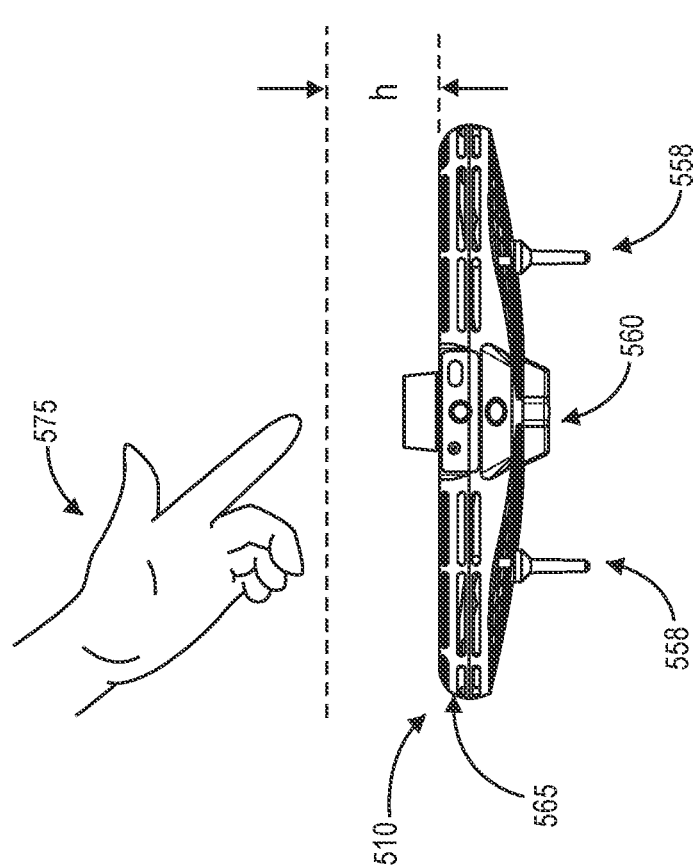

Similarly, as is shown in FIG. 5C, as the hand 575 approaches the aerial vehicle 510, the capacitive sensing system 560 determines a level of capacitance $C_3$ for the capacitor system including one or more of the conductive components 565 at a time $t_3$, which follows the time $t_2$. The level of capacitance $C_3$ is greater than both the level of capacitance $C_2$ and the level of capacitance $C_1$, due to the proximity of the hand 575, and the resulting changes in the behavior of the capacitive sensing system 560.

Figure 5D:
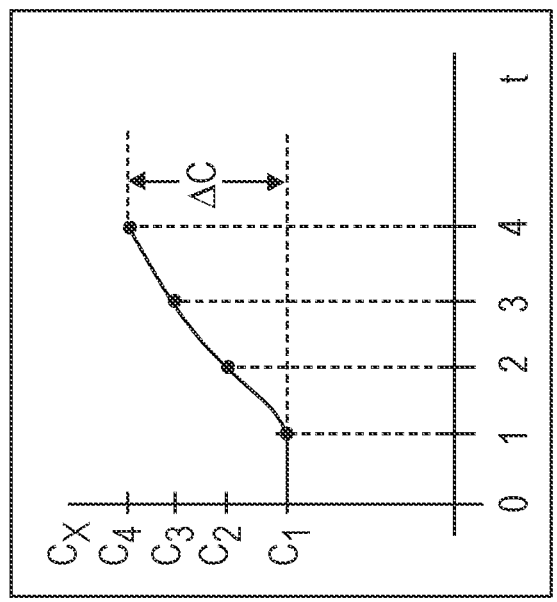
Figure 5D:
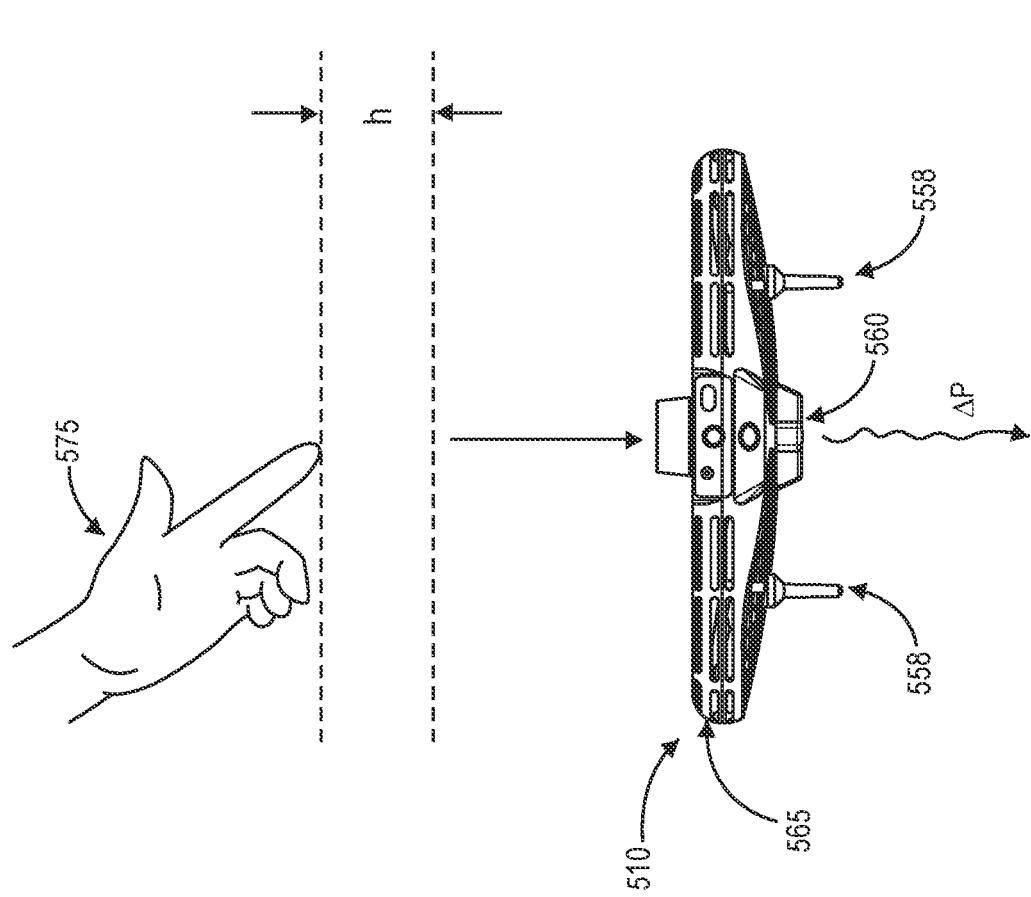

Finally, as is shown in FIG. 5D, as the hand 575 reaches the predetermined distance h from the aerial vehicle 510, the capacitive sensing system 560 determines a level of capacitance $C_4$ for the capacitor system including the one or more of the conductive components 565 at a time $t_4$, which follows the time $t_3$. The level of capacitance $C_4$ is greater than the level of capacitance $C_3$, the level of capacitance $C_2$ and the level of capacitance $C_1$, due to the proximity of the hand 575, and the resulting changes in the behavior of the capacitive sensing system 560, which may be configured to generate one or more signals upon determining that a body part of a human or another animal has caused a change in capacitance to exceed a predetermined threshold.

For example, upon detecting that a change $\Delta C$ in capacitance has been detected, the aerial vehicle 510 automatically initiates a change its position by descending by at least a predetermined distance $\Delta P$, such as by isolating power to motors of the aerial vehicle 510, or by instructing such motors to operate in a manner that causes the aerial vehicle 510 to descend by the distance $\Delta P$. In some implementations, the aerial vehicle 510 may operate such motors to cause a change in position that is vertically above or laterally departed from a position at which the maximum change $\Delta C$ in capacitance was detected. Alternatively, the aerial vehicle 510 may take any other action upon determining that the change $\Delta C$ in capacitance was detected.

Figure 6B:
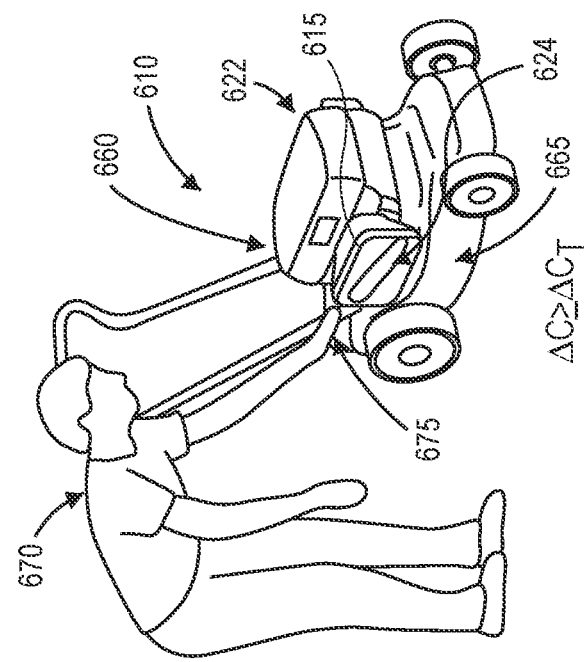
FIGS. 6A and 6B are views of aspects of one system in accordance with embodiments of the present disclosure.
Figure 6A:
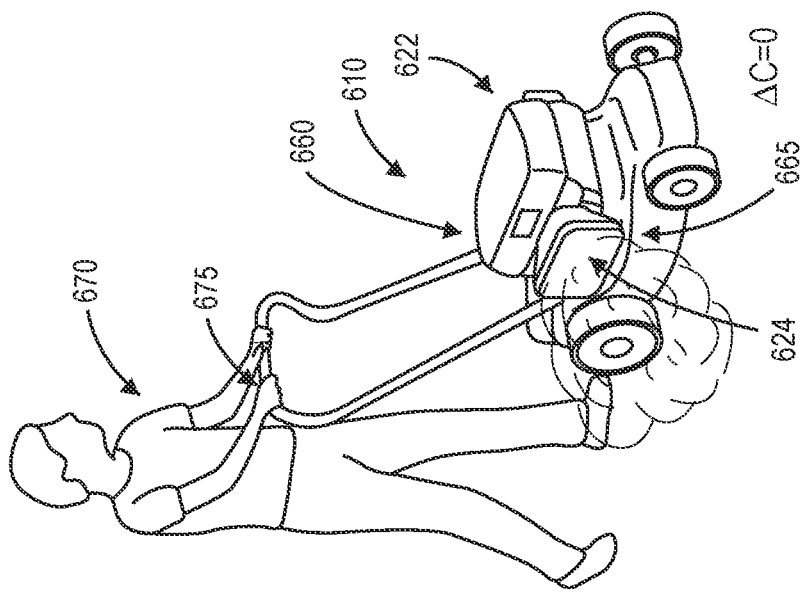

The systems and methods of the present disclosure are not limited for use in connection with aerial vehicles. Referring to FIGS. 6A and 6B, views of aspects of one system in accordance with embodiments of the present disclosure are shown.

As is shown in FIG. 6A, a human 670 operates a system 610 (viz., a lawn mower) using a pair of hands 675. The system 610 includes a motor 622, a rotating propeller 624 and a capacitive sensing system 660. The capacitive sensing system 660 includes a plurality of conductive components 665 provided about a perimeter or edge of a chute or other conduit extending between an interior of a housing 615 of the system 610 and an exterior of the housing 615 of the system 610. With the human 670 operating the system 610, and the propeller 624 rotating under power of the motor 622, a level of capacitance on the conductive components 665 remains unchanged, viz., $\Delta C=0$.

As is shown in FIG. 6B, as the human 670 extends one of the hands 675 toward the housing 615, thereby disrupting electric fields within a vicinity of the conductive components 665, a sensed change in capacitance $\Delta C$ equals or exceeds a threshold change in capacitance $\Delta C_T$. In response to determining that the sensed change in capacitance $\Delta C$ equals or exceeds the threshold change in capacitance $\Delta C_T$, the capacitive sensing system 660 generates and transmits one or more signals that may be interpreted to cause the motor 622 to stop operating, thereby causing the propeller 624 to stop rotating.

Figure 7B:
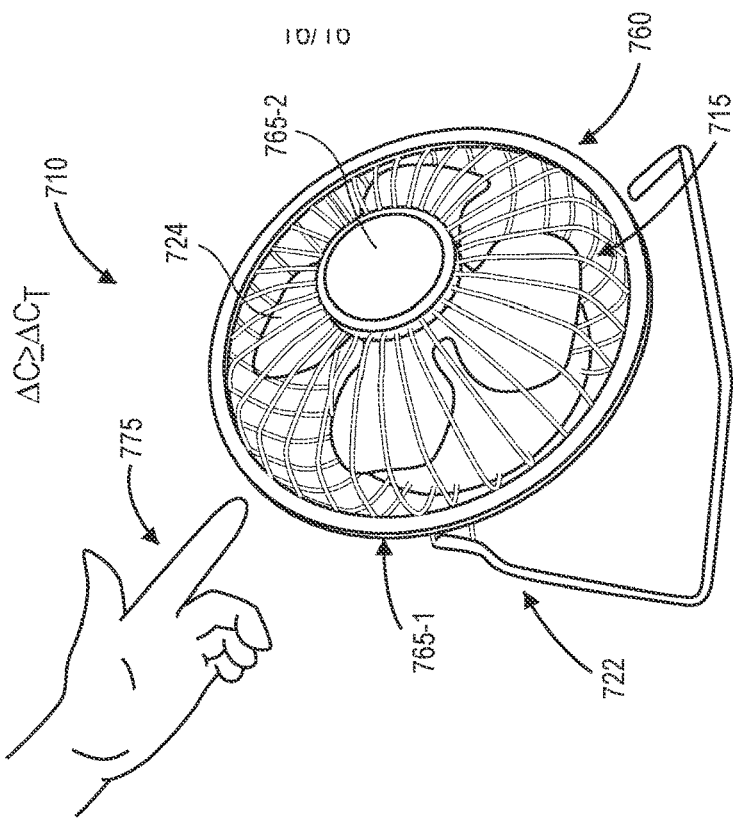
FIGS. 7A and 7B are views of aspects of one system in accordance with embodiments of the present disclosure.
Figure 7A:
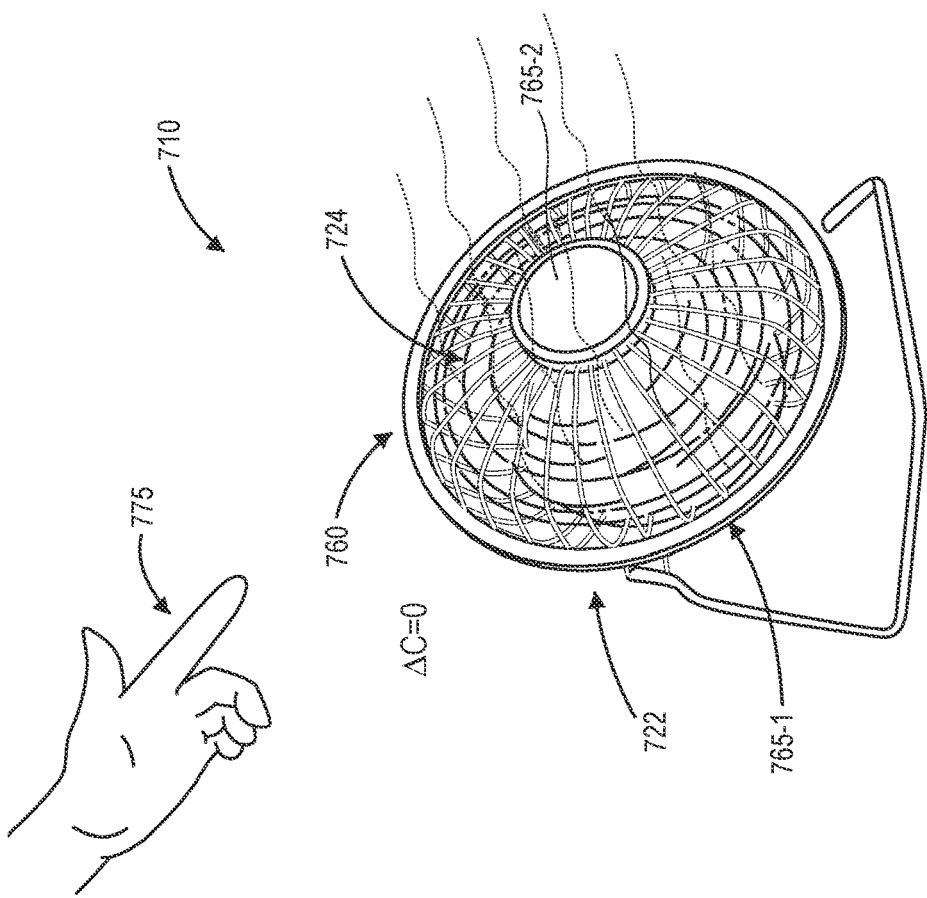

Referring to FIGS. 7A and 7B, views of aspects of one system in accordance with embodiments of the present disclosure are shown.

As is shown in FIG. 7A, a system 710 (viz., a table fan) includes a motor 722, a rotating propeller 724 and a capacitive sensing system 760. The capacitive sensing system 760 includes a pair of inner and outer conductive components 765-1, 765-2 provided about a perimeter or edge of a protective housing 715 of the system 710, within which the motor 722 operates to rotate the propeller 724. With a hand 775 of a grounded human sufficiently remote from the conductive components 765-1, 765-2, the propeller 724 rotates under power of the motor 722, and a level of capacitance on the conductive components 765-1, 765-2 remains unchanged, viz., $\Delta C=0$.

As is shown in FIG. 7B, as a hand 775 of a grounded human extends toward the housing 715, thereby disrupting electric fields within a vicinity of the conductive components 765-1, 765-2, a sensed change in capacitance $\Delta C$ on one or more of the conductive components 765-1, 765-2 equals or exceeds a threshold change in capacitance $\Delta C_T$. In response to determining that the sensed change in capacitance $\Delta C$ equals or exceeds the threshold change in capacitance $\Delta C_T$, the capacitive sensing system 760 generates and transmits one or more signals that may be interpreted to cause the motor 722 to stop operating, thereby causing the propeller 724 to stop rotating.

The contents of International Patent Publication No. WO 2021/061810 are incorporated by reference herein in their entirety.

Although some embodiments of the present disclosure show the use of autonomous vehicles in support of one or more applications or functions (e.g., security applications or functions) within indoor spaces of a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, such as the flow chart of FIG. 4, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
a first motor;
a first propeller;
an integrated circuit component;
a controller;
a protective mesh disposed proximate the first propeller, wherein the protective mesh comprises first plastic and first metal coupled to the first plastic;
a first line coupling the first metal of the protective mesh to a first terminal of the integrated circuit component;
a capacitor;
a second line coupling the first terminal to the capacitor;
a third line coupling the capacitor to a second terminal of the integrated circuit component; and
one or more computer readable media storing processor-executable instructions which, when executed using one or more processors of the unmanned aerial vehicle, cause the unmanned aerial vehicle to perform operations comprising:
determining that a change in capacitance associated with the first metal has exceeded a threshold at a first time, wherein the unmanned aerial vehicle is in a first position at the first time, and
in response to determining that the change in capacitance associated with the first metal has exceeded the threshold,
operating at least the first motor to cause the unmanned aerial vehicle to move from the first position to a second position.

2. The unmanned aerial vehicle of claim 1,
wherein the one or more computer-readable media comprise a first set of computer-readable media associated with the integrated circuit component and a second set of computer-readable media associated with the controller,
wherein the first set of one or more computer-readable media store processor-executable instructions which, when executed using one or more processors of the integrated circuit component, cause the integrated circuit component to perform operations comprising:
determining that the change in capacitance associated with the first metal has exceeded the threshold; and
in response to determining that the change in capacitance associated with the first metal has exceeded the threshold,
outputting a signal, and
wherein the second set of one or more computer-readable media store processor-executable instructions which, when executed using one or more processors of the controller, cause the unmanned aerial vehicle to perform operations comprising:
based at least in part on the signal,
operating at least the first motor to cause the unmanned aerial vehicle to move from the first position to the second position.

3. The unmanned aerial vehicle of claim 1,
wherein the one or more computer-readable media comprise a first set of computer-readable media associated with the integrated circuit component and a second set of computer-readable media associated with the controller,
wherein the first set of one or more computer-readable media store processor-executable instructions which, when executed using one or more processors of the integrated circuit component, cause the integrated circuit component to perform operations comprising:
determining that the change in capacitance associated with the first metal has exceeded the threshold; and
in response to determining that the change in capacitance associated with the first metal has exceeded the threshold,
incrementing a counter; and
outputting a signal based on a value of the counter, and
wherein the second set of computer-readable media store processor-executable instructions which, when executed using one or more processors of the controller, cause the unmanned aerial vehicle to perform operations comprising:
based at least in part on the signal,
operating at least the first motor to cause the unmanned aerial vehicle to move from the first position to the second position causing a speed of rotation of the first propeller to decrease.

4. The unmanned aerial vehicle of claim 1, wherein the first metal of the protective mesh is secured to an exterior of the first plastic of the protective mesh.

5. The unmanned aerial vehicle of claim 1, wherein the protective mesh is provided in association with an upper portion of a housing of the unmanned aerial vehicle.

6. The unmanned aerial vehicle of claim 1, wherein the protective mesh is provided in association with a lower portion of a housing of the unmanned aerial vehicle.

7. The unmanned aerial vehicle of claim 1, wherein the protective mesh is provided in association with a shroud portion of a housing of the unmanned aerial vehicle.

8. The unmanned aerial vehicle of claim 1, wherein the first plastic comprises at least one of:
an acrylonitrile butadiene styrene;
a composite material;
a polycarbonate;
a polystyrene; or
a recycled plastic.

9. The unmanned aerial vehicle of claim 1, wherein the first metal comprises copper.

10. The unmanned aerial vehicle of claim 1, wherein the first metal comprises aluminum.

11. The unmanned aerial vehicle of claim 1, wherein the first plastic of the protective mesh comprises a first plurality of openings, and
wherein the first metal of the protective mesh comprises a second plurality of openings aligned with the first plurality of openings.

12. The unmanned aerial vehicle of claim 1, wherein the first plastic of the protective mesh is injection molded around the first metal.

13. The unmanned aerial vehicle of claim 1,
wherein the one or more computer-readable media comprise a first set of computer-readable media associated with the integrated circuit component, and
wherein the first set of computer-readable media store processor-executable instructions which, when executed using one or more processors of the integrated circuit component, cause the integrated circuit component to perform operations comprising:
determining that the change in capacitance associated with the first metal has exceeded the threshold based at least in part on a number of rising or falling edges within a time period; and
in response to determining that the change in capacitance has exceeded the threshold,
outputting a signal based at least in part on the number of rising or falling edges; and
based at least in part on the signal,
operating at least the first motor to cause the unmanned aerial vehicle to move from the first position to the second position.

14. An unmanned aerial vehicle comprising:
a first motor;
a first propeller;
an integrated circuit component;
a controller comprising one or more processors;
a protective mesh disposed proximate the first propeller, wherein the protective mesh comprises first material and second material, and wherein the second material comprises metal;
an integrated circuit component coupled to the second material;
a capacitor coupled to the integrated circuit component and to the second material; and
one or more computer-readable media storing processor-executable instructions which, when executed using the one or more processors, cause the unmanned aerial vehicle to perform operations comprising:
receiving a signal generated by the integrated circuit component, wherein the signal indicates a change in capacitance associated with the second material, and
in response to receiving the signal,
operating the first motor to move the unmanned aerial vehicle to a selected position.

15. The unmanned aerial vehicle of claim 14, wherein the integrated circuit component comprises one or more computer-readable media storing processor-executable instructions which, when executed using one or more processors of the integrated circuit component, cause the integrated circuit component to perform operations comprising:
determining that change in capacitance has exceeded a threshold based at least in part on determining a number of rising or falling edges within a time period, and
in response to determining that the change in capacitance has exceeded a threshold,
outputting the signal.

16. The unmanned aerial vehicle of claim 14, wherein the second material is secured to an exterior of the first material.

17. The unmanned aerial vehicle of claim 14, wherein the first material forms a first portion comprising a first plurality of openings, and
wherein the second material forms a second portion comprising a second plurality of openings aligned with the first plurality of openings.

18. The unmanned aerial vehicle of claim 14, wherein the first material comprises at least one of:
an acrylonitrile butadiene styrene;
a carbon fiber;
a composite material;
a metal;
a polycarbonate;
a polystyrene;
a recycled plastic; or
a rubber.

19. The unmanned aerial vehicle of claim 14, wherein the second material comprises copper or aluminum.

20. The unmanned aerial vehicle of claim 14, wherein the integrated circuit component is configured to determine a capacitance value based on a discharge time for the capacitor.

21. The unmanned aerial vehicle of claim 14, wherein the integrated circuit component is configured to determine a capacitance value based on a number of rising or falling edges within a time period.

22. The unmanned aerial vehicle of claim 14, wherein the one or more computer-readable media store processor-executable instructions which, when executed using the one or more processors, cause the unmanned aerial vehicle to perform operations comprising:
selecting the position based at least in part on the change in capacitance.

23. The unmanned aerial vehicle of claim 14, wherein the one or more computer-readable media store processor-executable instructions which, when executed using the one or more processors, cause the unmanned aerial vehicle to perform operations comprising:
in response to receiving the signal,
causing a sound to be emitted by at least one speaker of the unmanned aerial vehicle.

24. The unmanned aerial vehicle of claim 14, wherein the one or more computer-readable media store processor-executable instructions which, when executed using the one or more processors, cause the unmanned aerial vehicle to perform operations comprising:

in response to receiving the signal,
 causing a light source of the unmanned aerial vehicle to emit light.

25. An unmanned aerial vehicle comprising:
a first motor;
a first propeller;
an integrated circuit component;
a controller comprising one or more processors;
a protective mesh disposed proximate the first propeller, wherein the protective mesh comprises first material and second material, and wherein the second material comprises metal;
an integrated circuit component coupled to the second material;
a capacitor coupled to the integrated circuit component and to the second material of the protective mesh; and
one or more computer-readable media storing processor-executable instructions which, when executed using the one or more processors, cause the unmanned aerial vehicle to perform operations comprising:
 receiving a signal generated by the integrated circuit component indicating a change in capacitance associated with at least a portion of the protective mesh comprising the second material; and
 in response to receiving the signal,
  causing the unmanned aerial vehicle to move in a first direction away from the portion of the protective mesh relative to a center of the unmanned aerial vehicle.

26. The unmanned aerial vehicle of claim 25, wherein the portion of the protective mesh is disposed generally above the first propeller, and
 wherein the first direction is generally downward.

27. The unmanned aerial vehicle of claim 25, wherein the portion of the protective mesh is disposed generally below the first propeller, and
 wherein the first direction is generally upward.

28. The unmanned aerial vehicle of claim 25, wherein a portion of the protective mesh is disposed proximate a first side of the unmanned aerial vehicle, and
 wherein the first direction is a direction away from the first side relative to the center of the unmanned aerial vehicle.

29. The unmanned aerial vehicle of claim 25, wherein the integrated circuit component comprises one or more computer-readable media storing processor-executable instructions which, when executed using one or more processors of the integrated circuit component, cause the integrated circuit component to perform operations comprising:
 determining that the change in capacitance has exceeded a threshold based at least in part on a number of rising or falling edges within a time period, and
 in response to determining that the change in capacitance has exceeded the threshold,
  outputting the signal.

* * * * *